(12) United States Patent
Pan

(10) Patent No.: US 8,538,203 B2
(45) Date of Patent: Sep. 17, 2013

(54) IMAGE UPSCALING TECHNIQUE

(75) Inventor: Hao Pan, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1274 days.

(21) Appl. No.: 11/998,496

(22) Filed: Nov. 30, 2007

(65) Prior Publication Data
US 2009/0028465 A1 Jan. 29, 2009

Related U.S. Application Data

(60) Provisional application No. 60/961,955, filed on Jul. 24, 2007, provisional application No. 60/994,547, filed on Sep. 19, 2007.

(51) Int. Cl.
| | |
|---|---|
| G06K 9/62 | (2006.01) |
| G06K 9/40 | (2006.01) |
| G06K 9/32 | (2006.01) |
| G06K 15/00 | (2006.01) |
| H04N 9/47 | (2006.01) |
| H04N 7/18 | (2006.01) |
| H04N 5/262 | (2006.01) |
| H04N 7/01 | (2006.01) |
| H04N 11/20 | (2006.01) |
| H04N 1/40 | (2006.01) |
| H04N 1/46 | (2006.01) |

(52) U.S. Cl.
USPC ........... 382/300; 382/155; 382/266; 348/63; 348/240.99; 348/441; 358/2.1; 358/525

(58) Field of Classification Search
USPC .......... 382/293, 298–301, 155, 266; 358/2.1, 358/3.27; 348/441–452, 63, 240.99
See application file for complete search history.

(56) References Cited

U.S. PATENT DOCUMENTS
| | | | |
|---|---|---|---|
| 5,444,487 A | 8/1995 | Kondo et al. | |
| 5,666,164 A | 9/1997 | Kondo et al. | |
| (Continued) | | | |

FOREIGN PATENT DOCUMENTS
| | | |
|---|---|---|
| JP | 4-129284 | 4/1992 |
| JP | 11-514810 | 12/1999 |
| JP | 2002-024815 | 1/2002 |
| JP | 2003-174557 | 6/2003 |
| WO | WO 03/102868 | 12/2003 |

OTHER PUBLICATIONS

Freeman, W.T.; Jones, T.R.; Pasztor, E.C., "Example-based super-resolution," Computer Graphics and Applications, IEEE, vol. 22, No. 2, pp. 56,65, Mar./Apr. 2002.*

(Continued)

*Primary Examiner* — Randolph I Chu
*Assistant Examiner* — Nathan Bloom
(74) *Attorney, Agent, or Firm* — Chernoff Vilhauer McClung & Stenzel, LLP

(57) ABSTRACT

A method for interpolation includes receiving an input image having a plurality of pixels. The edge direction proximate a first pixel of the input image is estimated using a first technique from a plurality of discrete potential directions. An edge direction is selected based upon the estimating the edge direction proximate the first pixel of the input image using a second technique. The pixels proximate the first pixel are interpolated based upon the selected edge direction. The pixels proximate the first pixel are interpolated based upon another technique. An output image is determined pixels having more pixels than the plurality of pixels.

26 Claims, 23 Drawing Sheets

(56) References Cited

U.S. PATENT DOCUMENTS

| | | |
|---|---|---|
| 6,323,905 B1 | 11/2001 | Kondo et al. |
| 6,434,280 B1 | 8/2002 | Peleg et al. |
| 6,466,702 B1 | 10/2002 | Atkins et al. |
| 6,690,842 B1 * | 2/2004 | Silver et al. .................... 382/300 |
| 6,766,067 B2 | 7/2004 | Freeman et al. |
| 6,766,068 B2 | 7/2004 | Aoyama et al. |
| 6,782,143 B1 * | 8/2004 | Dube et al. ..................... 382/300 |
| 7,106,914 B2 | 9/2006 | Tipping et al. |
| 7,215,831 B2 | 5/2007 | Altunbasak et al. |
| 7,218,796 B2 | 5/2007 | Bishop et al. |
| 7,239,428 B2 | 7/2007 | Solecki |
| 7,738,739 B2 * | 6/2010 | Altunbasak et al. .......... 382/300 |
| 2003/0179935 A1 * | 9/2003 | Kubota ......................... 382/199 |
| 2004/0184657 A1 * | 9/2004 | Lin et al. ....................... 382/159 |
| 2006/0290950 A1 | 12/2006 | Platt et al. |
| 2006/0291741 A1 | 12/2006 | Gomi et al. |

OTHER PUBLICATIONS

J.D. van Ouwerkerk, Image super-resolution survey, Image and Vision Computing, vol. 24, Issue 10, Oct. 1, 2006, pp. 1039-1052, ISSN 0262-8856, 10.1016/j.imavis.Feb. 26, 2006.*

Office Action in Chinese App. No. 200880025100.2, Sharp Kabushiki Kaisha, dated May 18, 2011, 19 pgs., including English translation.

Frank M. Candocia & Jose C. Principe, "A Neural Implementation of Interpolation with a Family of Kernels," Proc. Of the International Conference on Neural Networks, 1997, (ICNN 97), vol. III, pp. 1506-1511.

Frank M. Candocia & Jose C. Principe, "Superresolution of Images Based on Local Correlations," IEEE Transactions on Neural Networks, vol. 10, No. 2, pp. 372-380, Mar. 1999.

* cited by examiner

Linear regression with the linear model: using one straight line to approximate the training samples (dots).

Segmented linear regression: using two lines to approximate the training samples (dots).

(a) One breakpoint per predictor variable
(b) Three breakpoints per predictor variable Binary CART for classification of samples Multi-way CART for classification of samples The block-diagram of the training phase The block-diagram of updating the weights by breakpoints.

The block-diagram of updating the breakpoints by weights.

Updating the breakpoint (a) The LR window and its four generated HR pixels
(b) Rotating the LR window by 90 degrees
(c) Rotating the LR window by 180 degrees
(d) Rotating the LR window by 270 degrees The block-diagram of generating a HR window from a LR window
in the interpolation phase

IMAGE UPSCALING TECHNIQUE

CROSS-REFERENCE TO RELATED APPLICATIONS

This application claims the benefit of U.S. Provisional App. No. 60/961,955, filed Jul. 24, 2007, and U.S. Provisional App. No. 60/994,547, filed Sep. 19, 2007.

BACKGROUND OF THE INVENTION

The present invention relates to image upscaling.

Digital video is typically represented as a series of images or frames, each of which contains an array of pixels. Each pixel includes information, such as intensity and/or color information. In many cases, each pixel is represented as a set of three colors, each of which is defined by eight bit color values.

Pixel information within a frame may be missing such as boundary conditions that may result when executing a video conversion process, such as the conversion between interlaced television field signals and progressive frame signals. In other cases, a frame may be at a first resolution, such as standard definition, which is desirable to convert to a second resolution, such as high definition.

Standard techniques for pixel interpolation are based on application of classical linear filters. However, such techniques introduce various visual artifacts such as blurring of sharp edge patterns and detailed texture patterns in the image, ringing along edge contours, as well jaggedness along edge contours. Such artifacts generally cannot be avoided when standard linear filtering techniques are used for interpolation. Therefore, there is a need for improved techniques for pixel interpolation, such as techniques that are adaptive to local image patterns.

An improved technique for pixel interpolation is generally referred to as an edge-directed interpolation which seeks to generate a value for a missing pixel by extending the patterns in selected directions, expressed as edges which exist in the surrounding pixels of an image frame.

Unfortunately, it is difficult to determine the existence of an edge in an image and the direction of such an edge in an image. Erroneous estimates of the direction can lead to new visual artifacts in the image after interpolation. Therefore, there is a need for a robust technique for estimating the direction of a local edge pattern in an image. Furthermore, there is need for a robust image upscaling technique that considers the possibility of erroneous estimates of the direction, to avoid any visual artifacts. Furthermore, there is a need for an image upscaling technique with low computational complexity that can outperform standard linear filtering techniques in terms of visual quality.

In some images there tend to be a lot of texture, or regions where there are not well defined edges. In such a case, edge centric techniques have a tendency to identify false edges resulting in visual artifacts. Accordingly, it is desirable that a pixel interpolation technique is also suitable for texture based regions of an image.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
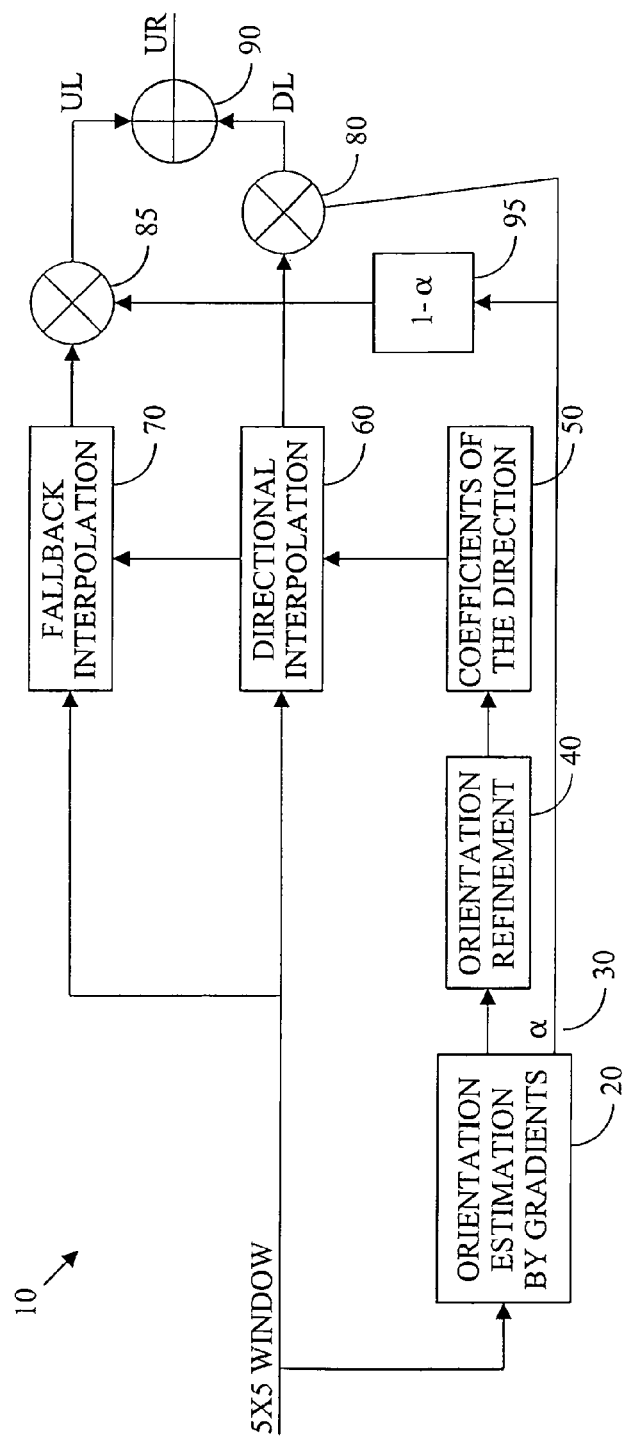
FIG. 1 is a block diagram of an image upscaling technique.

Referring to FIG. 1, an image upscaling technique includes directional based interpolation. The technique includes a window of image pixels 10 such as a 5 by 5 set of pixels (25 total pixels). Preferably the image upscaling technique is applied to each pixel of the image, with the 5 by 5 window of pixels being sequentially centered around each pixel of the image, such as in a raster scan fashion. The upscaling technique preferably estimates the edge orientation of the central pixel of the 5 by 5 window based upon the luminance Y component of the color image, even if no edge exists in the window. For example, Y can be calculated from RGB using the definition by CCIR709=0.2126R+0.7152G+0.0722B. The window of image pixels 10 is preferably moved around the image in a predefined manner such that the input image containing M×N pixels results in an output image of 2M×2N pixels. It is noted that a larger or smaller window of pixels may alternatively be used. A preferred window is a square window of pixels. It is also noted that a window with other shapes may alternatively be used, such as a rectangular window, or a diamond shaped window, or octagonal shaped window, and so forth.

The 5 by 5 window is used to determine the orientation (direction) of an edge at or near the central pixel. The orientation estimation 20 of the edges may use any suitable technique, such as using a gradient technique. A reliability measure 30 may be determined which estimates the likelihood that the orientation estimation 20 has determined an actual edge. The output of the orientation estimation 20 may be refined by an orientation refinement 40. The orientation refinement 40 may use a different technique from the orientation estimation 20 to select from among the best candidate(s) from the orientation estimation 20. The orientation refinement 40 reduces the likelihood of the orientation estimation 20 being in error as a result of local minimums in the estimation process.

The orientation refinement 40 is used to generate the coefficients of the direction 50. The coefficients of the direction 50 are used with a directional interpolation 60 to generate a set of one or more interpolated pixels in the 5 by 5 window. In some cases, the directional interpolation 60 does not provide accurate results, such as in the case that there is no defined edge within the 5 by 5 window. The upscaling technique may provide a fallback interpolation 70 that is not based to such a degree upon the determination of edges, described later.

Using the reliability measure 30 as a basis for determining an appropriate output, the fallback interpolation 70 may be multiplied by 1 minus the reliability measure 95 which is added 90 to the directional interpolation 60 multiplied by the reliability measure. In this manner, the output is a combination of the directional interpolation 60 and the fallback interpolation 70.

Figure 2:
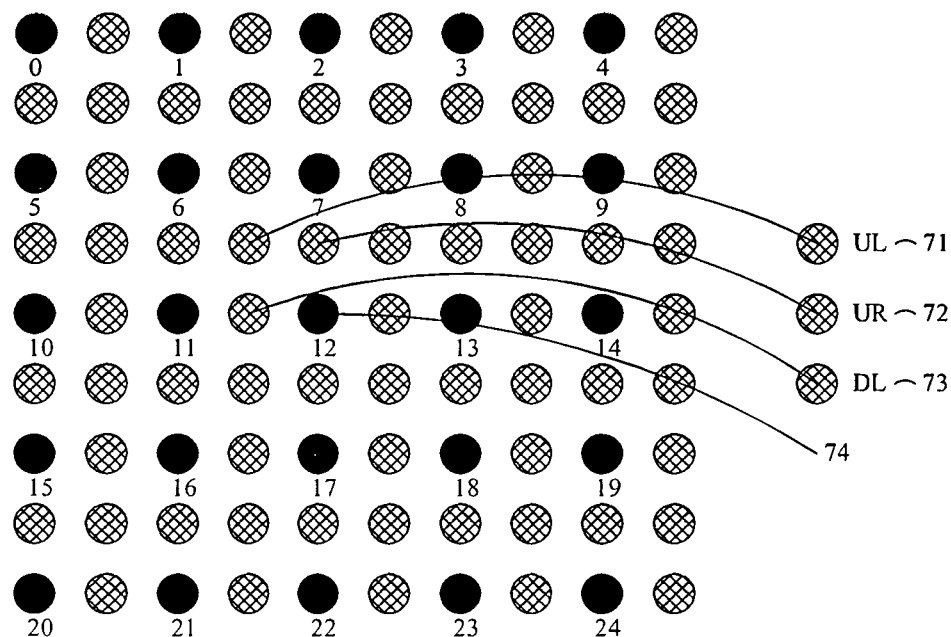
FIG. 2 illustrates a 5 by 5 window and three new pixels that are interpolated from the window.

Referring to FIG. 2, the orientation estimation 20 using gradients may estimate three new pixels ul 71, ur 72, and dl 73 around the center pixel 74. Where ul 71 represents upper left, ur 72 represents upper right, and dl 73 represents down left. The numbered pixels 0, 1, 2, 3, 4, 5, 6, 7, 8, 9, 10, 11, 12, 13, 14, 15, 16, 17, 18, 19, 20, 21, 22, 23, 24 are pixels in the input image. The other pixels are the interpolated pixels. The technique may quantize the edge orientation into a plurality of different directions to make a determination of where the edge may exist, if any. The quantization may include coefficients (most of them are preferably zero) for performing the interpolation along the edge orientation, not across the edge orientation.

The plurality of different directions may include, for example, 10 different directions defined as, −45 degrees, −26.6 degrees, −18.4 degrees, +18.4 degrees, +26.6 degrees, +45 degrees, +63.4 degrees, +71.6 degrees, +108.4 degrees, and +116.6 degrees. Each direction may be indexed with an index from 0 to 9, with direction with index 0 corresponding to −45 degrees, with index 1 corresponding to −26.6 degrees, with index 2 corresponding to −18.4 degrees, with index 3 corresponding to +18.4 degrees, with index 4 corresponding to +26.6 degrees, with index 5 corresponding to +45 degrees, with index 6 corresponding to +63.4 degrees, with index 7 corresponding to +71.6 degrees, with index 8 corresponding to +108.4 degrees, and with index 9 corresponding to +116.6 degrees. Along a direction, two parallelograms are formed so that the three new pixels (ul 210, ur 220, and dl 230) are either inside the parallelograms or on the boundaries. The new pixels (ul 210, ur 220, and dl 230) are interpolated using these parallelograms by averaging of pixels at either 4 corner points of a parallelogram, or by averaging pixels at 2 points in the 5 by 5 window. Other pixel selection techniques and calculation techniques may likewise be used. FIGS. 3-12 illustrate the preferred interpolation techniques and calculations for each of the edge directions.

Figure 3:
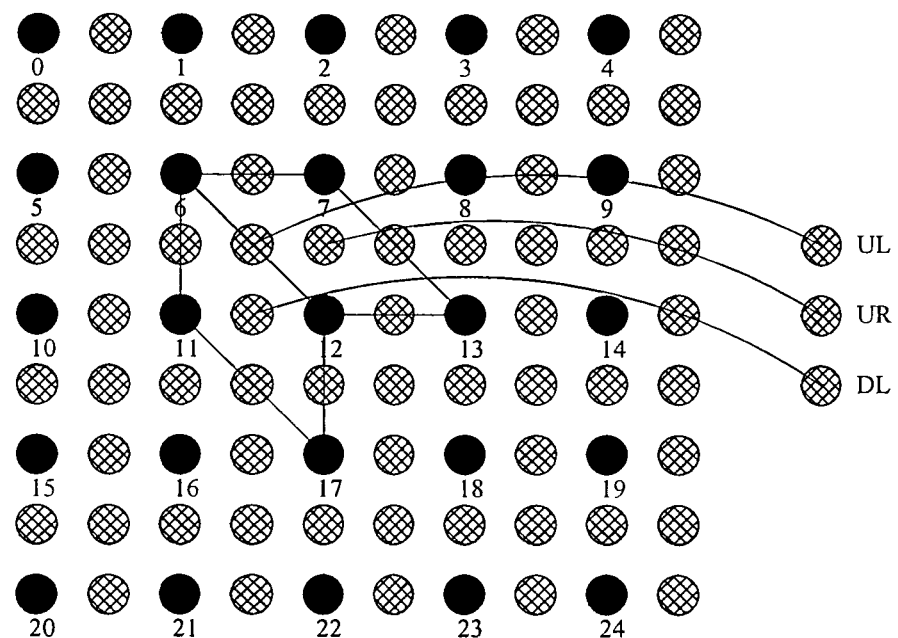
FIG. 3 illustrates an interpolation technique for −45 degrees.

FIG. 3 preferably uses an interpolation as follows:

$p_{ul}=(p_{06}+p_{12})/2$ $p_{dl}=(p_{06}+p_{11}+p_{12}+p_{17})/4$ $p_{ur}=(p_{06}+p_{07}+p_{12}+p_{13})/4$

Figure 4:
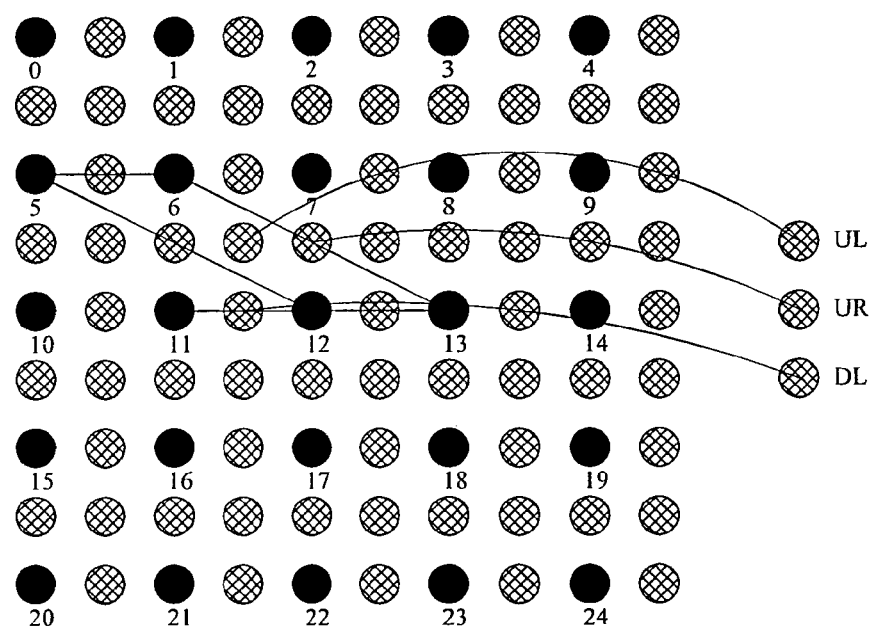
FIG. 4 illustrates an interpolation technique for −26.6 degrees.

FIG. 4 preferably uses an interpolation as follows:

$p_{ul}=(p_{05}+p_{06}+p_{12}+p_{13})/4$ $p_{dl}=(p_{11}+p_{12})/2$ $p_{ur}=(p_{06}+p_{13})/2$

Figure 5:
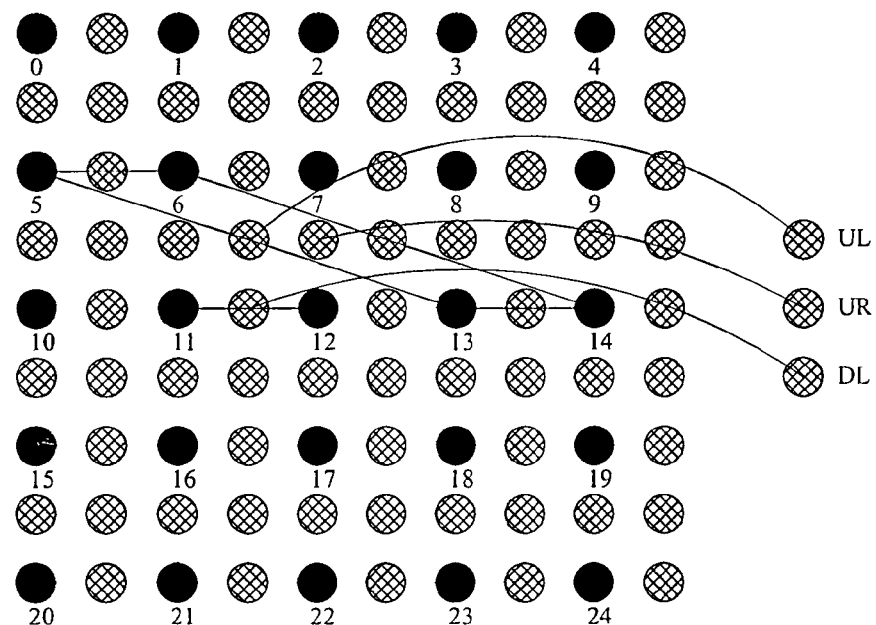
FIG. 5 illustrates an interpolation technique for −18.4 degrees.

FIG. 5 preferably uses an interpolation as follows:

$p_{ul}=(p_{05}+p_{13})/2$ $p_{dl}=(p_{11}+p_{12})/2$ $p_{ur}=(p_{05}+p_{06}+p_{13}+p_{14})/4$

Figure 6:
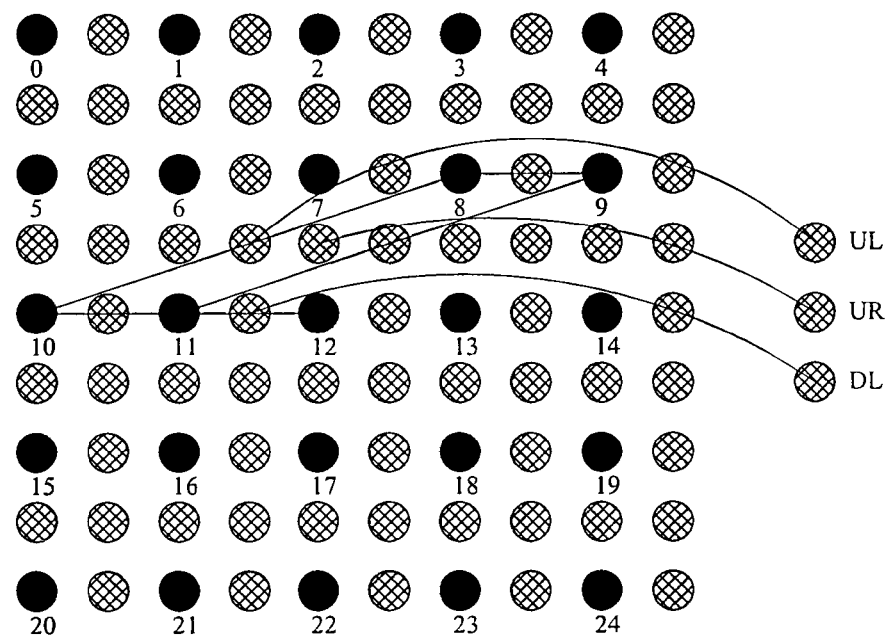
FIG. 6 illustrates an interpolation technique for +18.4 degrees.

FIG. 6 preferably uses an interpolation as follows:

$p_{ul}=(p_{8}+p_{10})/2$ $p_{dl}=(p_{11}+p_{12})/2$ $p_{ur}=(p_{8}+p_{9}+p_{10}+p_{11})/4$

Figure 7:
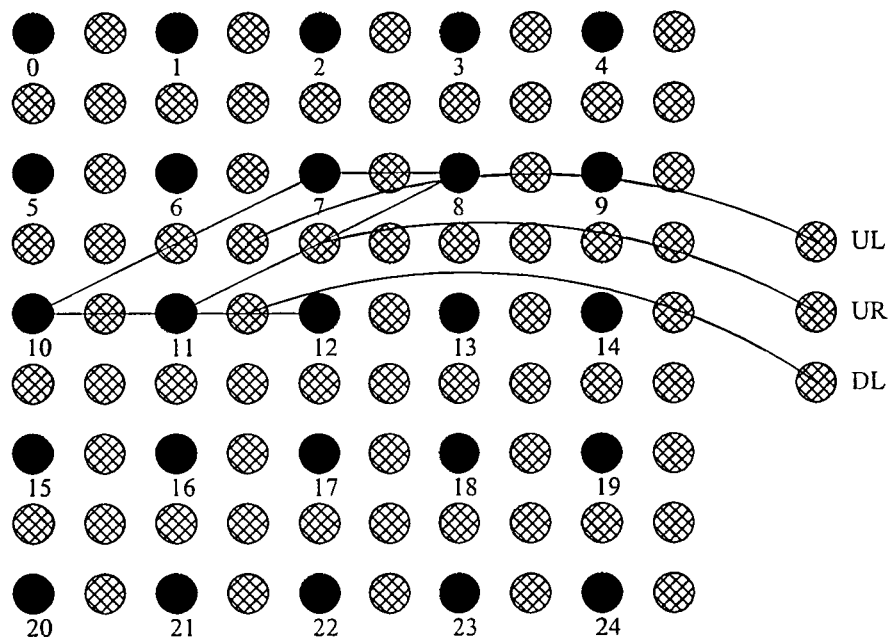
FIG. 7 illustrates an interpolation technique for +26.6 degrees.

FIG. 7 preferably uses an interpolation as follows:

$p_{ul}=(p_{7}+p_{8}+p_{10}+p_{11})/4$ $p_{dl}=(p_{11}+p_{12})/2$ $p_{ur}=(p_{8}+p_{11})/2$

Figure 8:
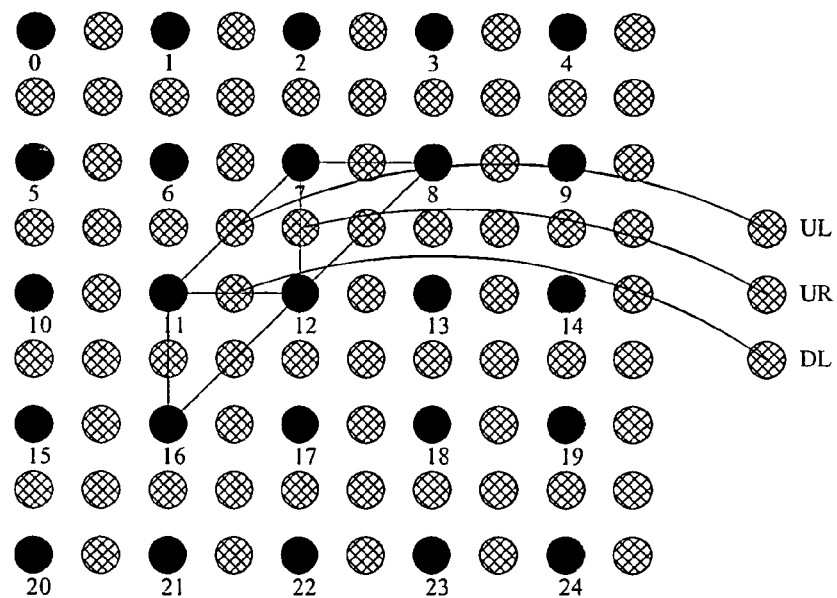
FIG. 8 illustrates an interpolation technique for +45 degrees.

FIG. 8 preferably uses an interpolation as follows:

$p_{ul}=(p_{7}+p_{11})/2$ $p_{dl}=(p_{7}+p_{11}+p_{12}+p_{16})/4$ $p_{ur}=(p_{7}+p_{8}+p_{11}+p_{12})/4$

Figure 9:
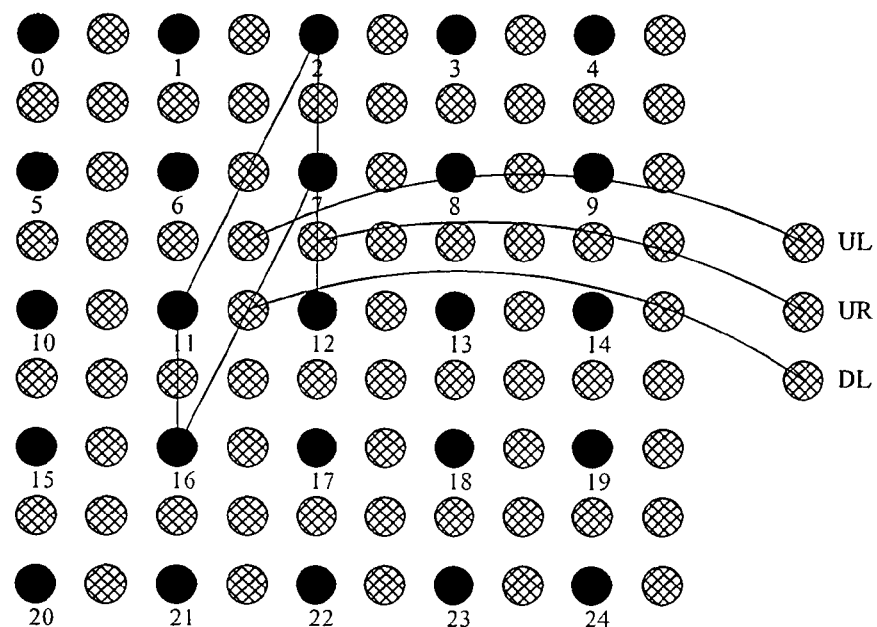
FIG. 9 illustrates an interpolation technique for +63.4 degrees.

FIG. 9 preferably uses an interpolation as follows:

$p_{ul}=(p_{02}+p_{7}+p_{11}+p_{16})/4$ $p_{dl}=(p_{7}+p_{16})/2$ $p_{ur}=(p_{7}+p_{12})/2$

Figure 10:
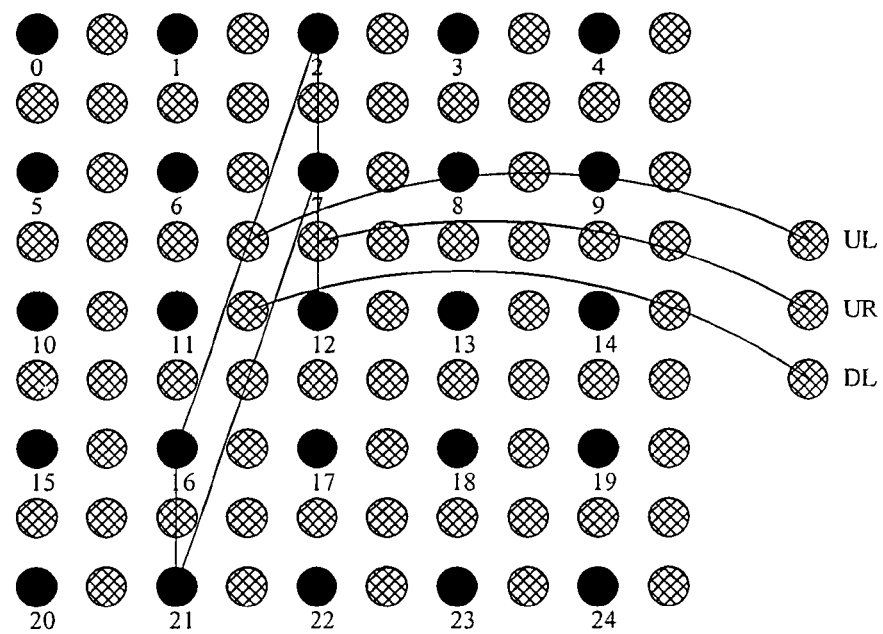
FIG. 10 illustrates an interpolation technique for +71.6 degrees.

FIG. 10 preferably uses an interpolation as follows:

$p_{ul}=(p_{2}+p_{16})/2$ $p_{dl}=(p_{2}+p_{7}+p_{16}+p_{21})/4$ $p_{ur}=(p_{7}+p_{12})/2$

Figure 11:
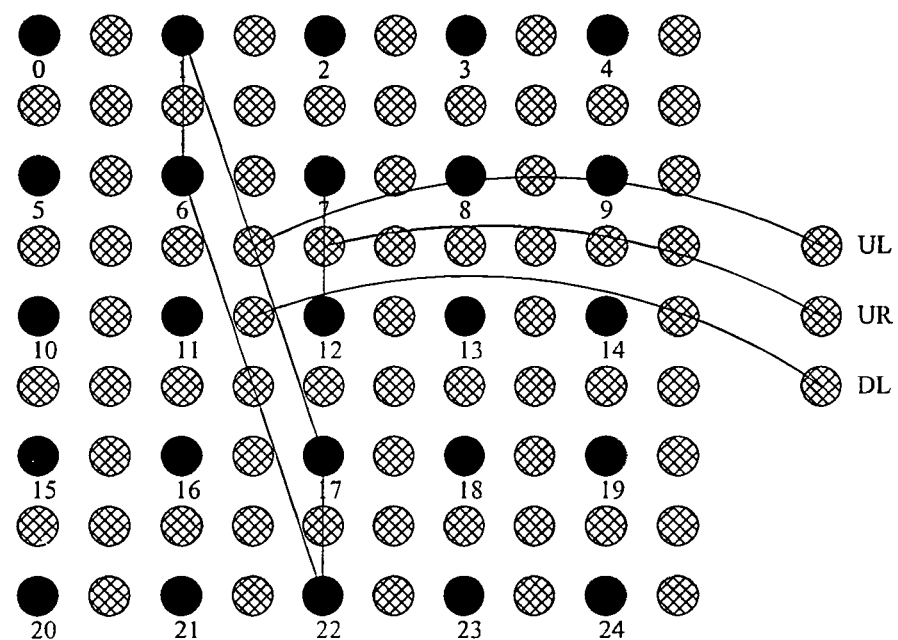
FIG. 11 illustrates an interpolation technique for +108.4 degrees.

FIG. 11 preferably uses an interpolation as follows:

$p_{ul}=(p_{1}+p_{12})/2$ $p_{dl}=(p_{1}+p_{6}+p_{17}+P_{22})/4$ $p_{ur}=(p_{7}+p_{12})/2$

Figure 12:
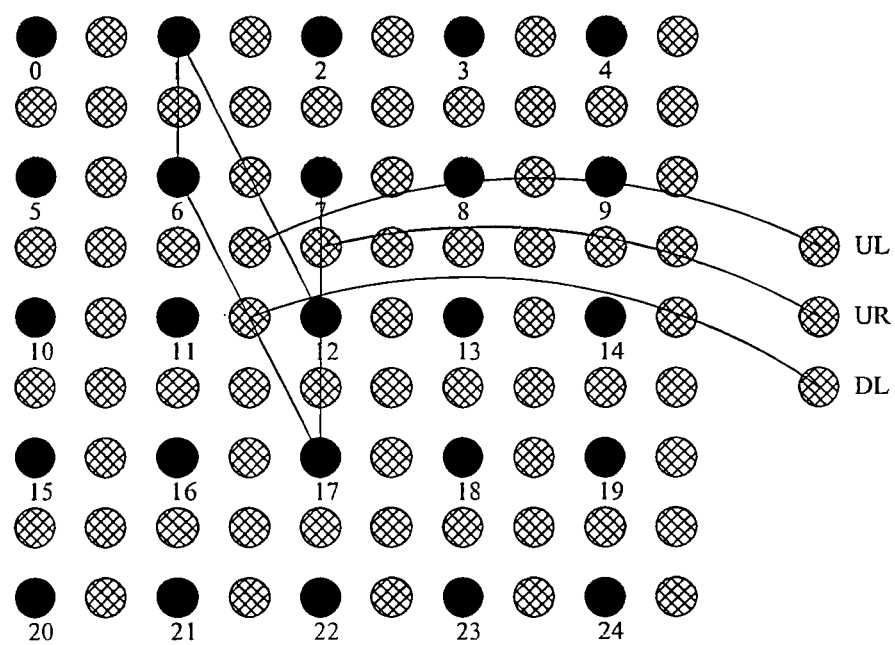
FIG. 12 illustrates an interpolation technique for +116.6 degrees.

FIG. 12 preferably uses an interpolation as follows:

$p_{ul}=(p_{1}+p_{6}+p_{12}+p_{17})/4$ $p_{dl}=(p_{6}+p_{17})/2$ $p_{ur}=(p_{12}+p_{7})/2$

Figure 13:
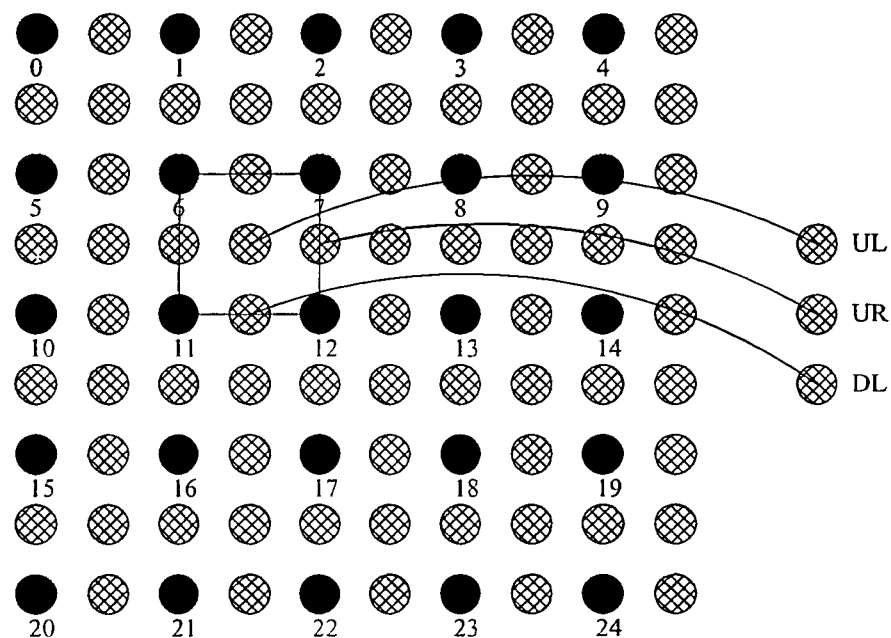
FIG. 13 illustrates an interpolation technique for non-directional.

FIG. 13 preferably uses an interpolation as follows:

$$p_{ul} = (p_{06} + p_{07} + p_{11} + p_{12})/4$$

$$p_{dl} = (p_{11} + p_{12})/2$$

$$p_{ur} = (p_{07} + p_{12})/2$$

The orientation estimation may calculate the image gradient vectors at pixels 6, 7, 8, 11, 12, 13, 16, 17, 18 in the 5×5 window for the central pixel 74. These pixels are the inner 9 pixels of the 5×5 window. Each gradient vector consists of a spatial image derivative in the x direction (horizontal) and a spatial image derivative in the y direction (vertical). In other words, $\text{grad}_i = (\text{gradX}_i, \text{gradY}_i)^T$. The gradient calculation is performed using a pair of spatial derivative operators. The first operator computes the derivative in the x direction, and the second operator computes the derivative in the y direction. For example, the technique may utilize the well-known Sobel operators:

y direction:

$$\begin{bmatrix} -1 & -2 & 1 \\ 0 & 0 & 0 \\ 1 & 2 & 1 \end{bmatrix}$$

and x-direction:

$$\begin{bmatrix} -1 & 0 & 1 \\ -2 & 0 & 2 \\ -1 & 0 & 1 \end{bmatrix}$$

Other operators may likewise be used and other image derivative operators may likewise be used.

An estimate of the initial orientation direction $\theta_{int}$ may be calculated as follows:

$$\theta_{int} = \arg\min_{\theta} \sum_{i=6,7,8,11,12,13,16,17,18} |\text{gradX}_i \cos\theta - \text{gradY}_i \sin\theta|$$

θ tends to assume that the 9 pixels show the same edge orientation (e.g., correlated). Because θ is quantized into 10 values, the above equation can be readily solved by exhaustive search. In other words, the sum in the above equation only needs to be evaluated 10 times for the 10 defined orientations. The orientation with the minimum value for the sum corresponds to the initial estimate of the orientation.

Note that the above equation is based on taking the sum of absolute values of differences. Other criteria may be used as well, such as the sum of squared differences. However, taking the sum of absolute values as in the above equation is tolerant to outliers and is therefore robust.

The direction estimated by gradient calculation is not always accurate, and therefore the estimate is refined by the orientation refinement 40. The sum of absolute differences for each direction may be defined as follows.

$$\text{Diff}[0] = w[0] \cdot \{\text{abs}(p_{13} - p_7) + \text{abs}(p_{12} - p_6) + \text{abs}(p_{11} - p_5) + \text{abs}(p_8 - p_2) + \\ \text{abs}(p_7 - p_1) + \text{abs}(p_6 - p_0) + \text{abs}(p_{18} - p_{12}) + \\ \text{abs}(p_{17} - p_{11}) + \text{abs}(p_{16} - p_{10})\}$$

$$\text{Diff}[1] = w[1] \cdot \{\text{abs}(p_{13} - p_6) + \text{abs}(p_{12} - p_5) + \text{abs}(p_{14} - p_7) + \\ \text{abs}(p_8 - p_1) + \text{abs}(p_7 - p_0) + \text{abs}(p_9 - p_2) + \\ \text{abs}(p_{18} - p_{11}) + \text{abs}(p_{17} - p_{10}) + \text{abs}(p_{19} - p_{12})\}$$

$$\text{Diff}[2] = w[2] \cdot \{\text{abs}(p_{14} - p_6) + \text{abs}(p_{13} - p_5) + \text{abs}(p_9 - p_3) + \\ \text{abs}(p_8 - p_0) + \text{abs}(p_{19} - p_{13}) + \text{abs}(p_{18} - p_{10})\}$$

$$\text{Diff}[3] = w[3] \cdot \{\text{abs}(p_{10} - p_8) + \text{abs}(p_{11} - p_9) + \text{abs}(p_5 - p_3) + \\ \text{abs}(p_6 - p_4) + \text{abs}(p_{15} - p_{13}) + \text{abs}(p_{16} - 14)\}$$

$$\text{Diff}[4] = w[4] \cdot \{\text{abs}(p_{10} - p_7) + \text{abs}(p_{11} - p_8) + \text{abs}(p_{12} - p_9) + \\ \text{abs}(p_5 - p_2) + \text{abs}(p_6 - p_3) + \text{abs}(p_7 - p_4) + \\ \text{abs}(p_{15} - p_{12}) + \text{abs}(p_{16} - p_{13}) + \text{abs}(p_{17} - p_{14}\}$$

$$\text{Diff}[5] = w[5] \cdot \{\text{abs}(p_{10} - p_6) + \text{abs}(p_{11} - p_7) + \text{abs}(p_{12} - p_8) + \\ \text{abs}(p_5 - p_1) + \text{abs}(p_6 - p_2) + \text{abs}(p_7 - p_3) + \\ \text{abs}(p_{15} - p_{11}) + \text{abs}(p_{16} - p_{12}) + \text{abs}(p_{17} - p_{13})\}$$

$$\text{Diff}[6] = w[6] \cdot \{\text{abs}(p_{11} - p_2) + \text{abs}(p_{16} - p_7) + \text{abs}(p_{21} - p_{12}) + \\ \text{abs}(p_{10} - p_1) + \text{abs}(p_{15} - p_6) + \text{abs}(p_{20} - p_{11}) + \\ \text{abs}(p_{12} - p_3) + \text{abs}(p_{17} - p_8) + \text{abs}(p_{22} - p_{13})\}$$

$$\text{Diff}[7] = w[7] \cdot \{\text{abs}(p_{16} - p_2) + \text{abs}(p_{21} - p_7) + \text{abs}(p_{15} - p_1) + \\ \text{abs}(p_{20} - p_6) + \text{abs}(p_{17} - p_3) + \text{abs}(p_{22} - p_8)\}$$

$$\text{Diff}[8] = w[8] \cdot \{\text{abs}(p_1 - p_{17}) + \text{abs}(p_6 - p_{22}) + \text{abs}(p_0 - p_{16}) + \\ \text{abs}(p_5 - p_{21}) + \text{abs}(p_2 - p_{18}) + \text{abs}(p_7 - p_{23})\}$$

$$\text{Diff}[9] = w[9] \cdot \{\text{abs}(p_{11} - p_{22}) + \text{abs}(p_6 - p_{17}) + \text{abs}(p_1 - p_{12}) + \\ \text{abs}(p_{10} - p_{21}) + \text{abs}(p_5 - p_{16}) + \text{abs}(p_0 - p_{11}) + \\ \text{abs}(p_{12} - p_{23}) + \text{abs}(p_7 - p_{18}) + \text{abs}(p_2 - p_{13})\}$$

The weights w[n] in the above expressions serve the following purposes:

a. For some of the directions there are fewer terms in the sum of absolute differences compared to other directions. The weights can be used to compensate for this.

b. The weights can be further optimized in order to favor particular directions and discourage other directions. The technique will favor directions with a low weight and discourage directions with a high weight.

From the orientation refinement 40, the technique has computed the index of the initial direction estimate. The technique further compares the sum of absolute differences of index−1, index, and index+1, and picks the lowest one as the refined estimated direction. In other words, the technique computes the values of Diff[index−1], Diff[index], and Diff[index+1], where index corresponds to the index of the initial direction estimate. If Diff[index−1] is the lowest of the three values, then index−1 determines the final direction estimate; otherwise, if Diff[index] is the lowest of the three values, then index determines the final direction estimate; otherwise index+1 determines the final direction estimate.

The following table summarizes the orientation angles that are defined, their index and their preferred weight value.

| Index | Angle | Weight w [.] |
| --- | --- | --- |
| 0 | −45.0 | 1.0 |
| 1 | −26.6 | 1.0 |
| 2 | −18.4 | 1.5 |
| 3 | 18.4 | 1.5 |
| 4 | 26.6 | 1.0 |
| 5 | 45.0 | 1.0 |
| 6 | 63.4 | 1.0 |
| 7 | 71.6 | 1.5 |
| 8 | 108.4 | 1.5 |
| 9 | 116.6 | 1.0 |

If $\theta:_{int}$ is the initial interpolation direction, then the technique may compute the reliability indicator 30 of the direction estimation as follows:

$$\alpha = 1 - \frac{\sum_i |gradX_i \cos\theta_{int} - gradY_i \sin\theta_{int}|}{\sum_i |gradX_i \cos(\theta_{int} + \pi/2) - gradY_i (\sin\theta_{int} + \pi/2)|}$$

The value of the reliability indicator α is between 0.0 and 1.0. Note that the numerator of the above expression contains the same sum that was used for the initial direction estimation, while the denominator contains a similar sum based on an angle perpendicular to the estimated $\theta_{int}$. If the image structure is locally highly directional, for example due to the presence of an edge, the numerator tends to be much smaller than the denominator, therefore the second term in the above equation tends to be small values, closer to 0.0, and α tends to be 1. If the image structure does not have any dominant orientation, the numerator and denominator tend to have the same magnitude, therefore α tends to 0.0. This may be the case in a texture area of the image, for example. The computation of the reliability indicator may be suitably modified to handle the case where the denominator is very close to 0.0. Furthermore, the above reliability indicator may alternatively be computed based on sums of squared differences instead of sums of absolute differences. In any event, it is desirable to include a fall back interpolation technique 70 that is suitable for accurately interpolating regions of texture. With such a combination, the edge adaptive technique and the texture technique, an improved interpolation may be achieved. In particular, the linear techniques increases the number of pixels, but not the high frequency part of the spectrum, and therefore does not increase the perceived sharpness of the image especially for regions of the image that are textured.

To increase the perceived sharpness in the up-converted image, especially for regions that are texture based, a training-based content-adaptive technique may be used. This type of training-based content-adaptive interpolation techniques has two phases: the training phase and the interpolation phase. The training phase is done offline by using a number of low-resolution (LR) images and their high-resolution (HR) counterparts as training data to define relationships between the LR images and the HR images. In the training phase, different sets of linear filter coefficients are derived from the training data for different local contents. The interpolation phase is done on-line by interpolating LR images not in the training data. In the interpolation phase, a set of the linear filter coefficients for a particular position in the LR image is chosen to interpolate HR pixels around that positions based on the local content. Although locally the interpolation is based on linear filtering, but because of the content adaptation of the linear filter coefficients, globally this type of the technique is non-linear.

An image up-scaling technique suitable for standard definition television images to high definition images preferably up-scales the image by a factor of 2 on each of its two orthogonal dimensions. It is to be understood that the techniques described herein can be used for any up-scaling factor, such as 2.2, 4, or 10. The input image is referred to as the LR (low resolution) image, and the output up-scaled image is referred to as the HR (high resolution) image. The upscaling factor is preferably 2, so the HR image has four times as many pixels as the LR image. For example, if the input LR image has a resolution of 300×200 (a matrix of 300 columns and 200 rows), then the image up-scaling technique outputs the up-scaled HR image with the resolution of 600×400 (a matrix of 600 columns and 400 rows).

Figure 14:
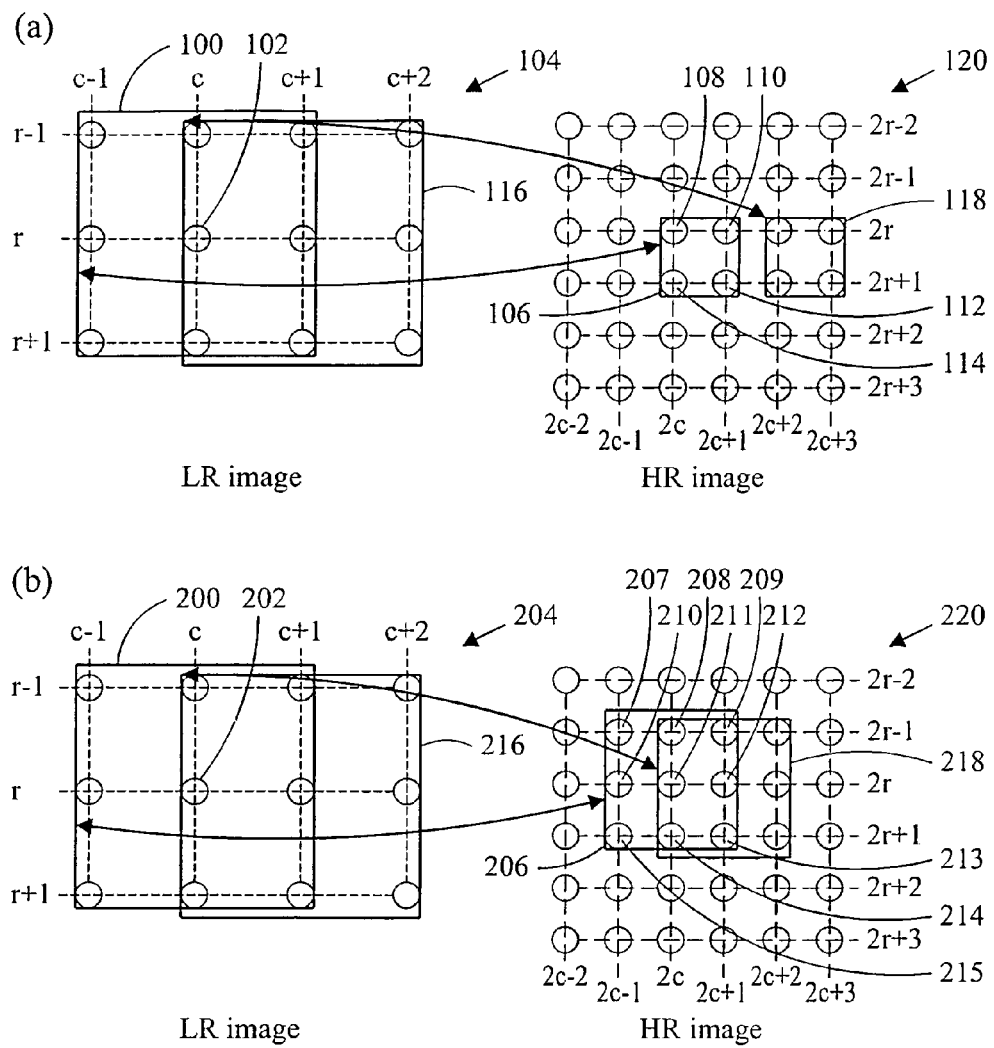
FIG. 14 illustrates the relationship between low resolution and high resolution images.

Referring to FIG. 14(a), the image up-scaling technique may be "window" based that defines windows on both input LR and output up-scaled HR images. The "widow" may be any set of continuous or discontinuous pixels. A LR window 100 is defined that is centered at pixel position (c, r) 102 of a LR image 104. The image upscaling technique generates either four or nine HR pixels (HR window 106) from the LR window 100 centered at or close to pixel position (2c, 2r) 108 in the HR image 120. The HR pixels 108, 110, 112, 114 form the HR window 106.

The image up-scaling technique moves the LR window 100 sequentially centered at every pixel of the input LR image 104, and each LR window generates a corresponding HR window. For example LR window 116 results in corresponding HR pixels 118. The nearby LR windows typically overlap to a greater or lesser extent, while the nearby HR windows may or may not overlap depending upon the number of pixels generated from a LR window. If each LR window generates four HR pixels, then the HR windows will typically not overlap, however, if each LR window generates nine pixels, then the HR windows will generally overlap. As illustrated in FIG. 14(a), four HR pixels are generated from one LR window and they form a HR window. It is also noted that the HR windows do not overlap.

Referring to FIG. 14(b), the image up-scaling technique may be "window" based that defines windows on both input LR and output up-scaled HR images. The "widow" may be any set of continuous or discontinuous pixels. A LR window 200 is defined that is centered at pixel position (c, r) 202 of a LR image 204. The image upscaling technique generates either nine HR pixels (HR window 206) from the LR window 200 centered at or close to pixel position (2c, 2r) 208 in the HR image 220. The HR pixels 207, 208, 209, 210, 211, 212, 213, 214, 215 form the HR window 206.

The image up-scaling technique moves the LR window 200 sequentially centered at every pixel of the input LR image 204, and each LR window generates a corresponding HR window. For example LR window 216 results in corresponding HR pixels 218. The nearby LR windows typically overlap to a greater or lesser extent, while the nearby HR windows may or may not overlap depending upon the number of pixels generated from a LR window. If each LR window generates four HR pixels, then the HR windows will typically not overlap, however, if each LR window generates nine pixels, then the HR windows will generally overlap. In FIG. 14(b), nine HR pixels are generated from one LR window and they form a HR window. In is also noted that the HR windows do overlap.

The image up-scaling technique includes a training phase which generates the HR pixels from a LR window that is learned from a number of LR images and their corresponding HR versions (the training set). Typically, a set of HR images are selected from which are generated LR versions, which are then used for the training phase. Then in the interpolation phase, the image up-scaling technique uses learned knowledge to generate new HR images based upon the input LR images.

The image up-scaling technique may treat the training as a regression analysis problem that builds a mathematical model f(X), from the M training samples to minimize the following mean square error:

$$E = \frac{1}{M} \sum_{i=1}^{M} (f(X_i) - Y_i)^2 \qquad (1)$$

where $X_i = [x_{1,i} \, x_{2,i} \ldots x_{m,i}]^T$ and $Y_i = [y_{1,i} \, y_{2,i} \ldots y_{n,i}]^T$, $i=1, 2 \ldots M$, are the pixels in a LR and HR window in the training data, respectively. By the terminology of regression analysis, $X_i$ is a predictor variable vector in a m-dimensional predictor space, and $Y_i$ is a dependent variable vector in a n-dimensional dependent space. It is to be understood that other analysis techniques, may likewise be used.

Figure 15:
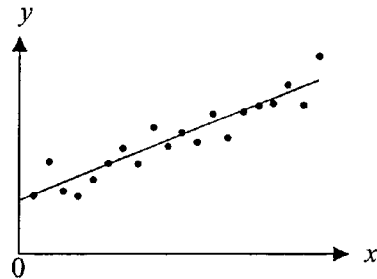
FIG. 15 illustrates linear regression.

Referring to FIG. 15, the regression analysis determines a regression model. The technique may start with a simple regression model, such as a linear regression model.

$$f(X) = wX + v$$

Then the task of regression analysis becomes to estimate m-by-n-dimensional w and m-by-1-dimensional v from the training samples $X_i$ and $Y_i$. Linear regression with linear model on a simple 1-D predictor space is illustrated in FIG. 15.

However, the training samples of image upscaling have demonstrated strong heterogeneousness, and the above linear regression model does not tend to sufficiently describe the relation between $X_i$ and $Y_i$. Therefore, the image up-scaling technique may use a nonlinear regression model, such as a segmented linear regression. It is to be understood that other nonlinear techniques, may likewise be used.

Figure 16:
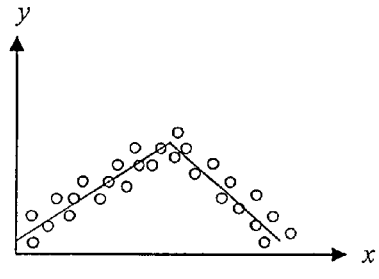
FIG. 16 illustrates segmented linear regression.

The segmented linear regression divides the predictor space $\Theta$ into many sub-spaces $\Theta_1, \Theta_2, \ldots \Theta_P$, and models each sub-space with the linear regression model. Mathematically, the segmented linear regression can be expressed as $$f(X) = \begin{cases} w_1 X + v_1 & \text{if } X \in \Theta_1 \\ w_2 X + v_2 & \text{if } X \in \Theta_2 \\ \vdots & \vdots \\ w_p X + v_p & \text{if } X \in \Theta_p \end{cases} \qquad (2)$$

where $\Theta_1, \Theta_2, \ldots, \Theta_p$ are the sub-spaces, and $\Theta_1 + \Theta_2 + \ldots + \Theta_p$ is the predictor space. Segmented linear regression of a simple 1-D predictor space is illustrated in FIG. 16.

The segmented linear regression partitions the predictor space into sub-spaces, and each of them can be modeled by a linear regression model. Theoretically, there are countless possibilities of partition techniques, and some possibilities can have high computational costs and be trapping to a local minimum. One partition technique that can be used is a classification and regression tree (CART).

CART puts a restriction on the partition of the predictor space. Specifically, CART splits every (or a selected set of) predictor variable into segments by one or more breakpoint(s), and uses these segments of different predictor variables to form sub-spaces. If the high-dimensional predictor space is a big rectangle on a hyperplane, then CART cuts the big rectangle into many smaller rectangles along the orientation of the boundaries of the big rectangle.

Figure 17:
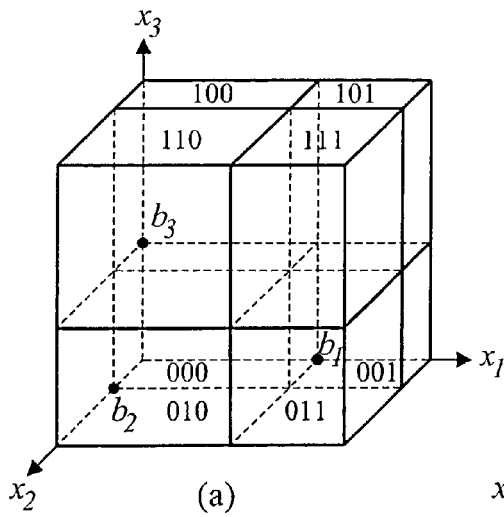
FIGS. 17(a)-17(b) illustrates breakpoints per predictor variable.
Figure 17:
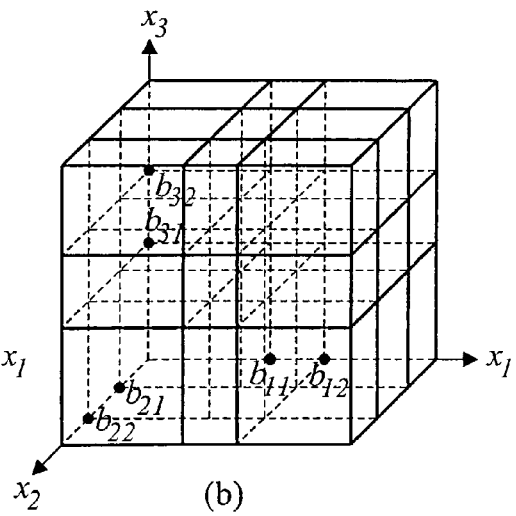

Assuming that each predictor variable $x_j$ has one breakpoint $b_j$, then a m-dimensional predictor space has total m breakpoints $B = [b_1, b_2, \ldots b_m]$. Totally there are $2^m$ sub-spaces, as illustrated in FIG. 17(a). FIG. 17(a) shows a 3-dimensional predictor variable space, and each predictor variable has one breakpoint. There are totally $2^3 = 8$ sub-spaces.

Each predictor variable can also define more than one breakpoint. FIG. 17(b) illustrates that every predictor variable has two breakpoints, and there are $3^3 = 27$ sub-spaces in the predictor space.

Figure 18:
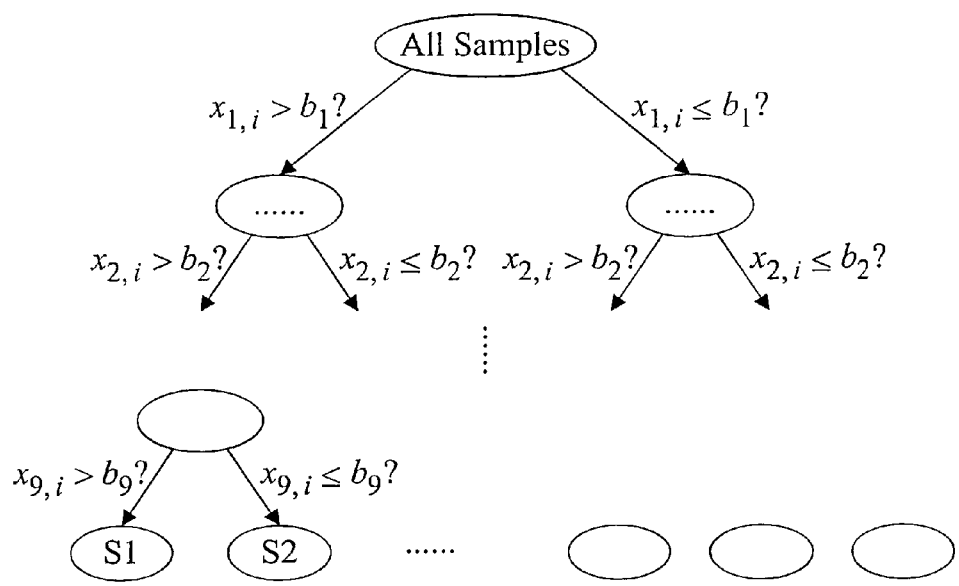
FIG. 18 illustrates binary CART.
Figure 19:
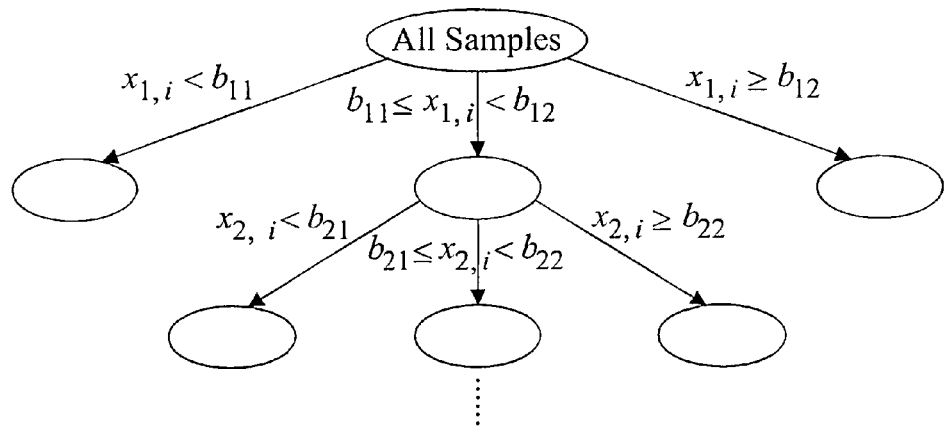
FIG. 19 illustrates multi-way CART.

Once the partition of predictor space is determined, classification of samples is putting samples into classes, where each class is defined by a sub-space. The strong restriction on the partition method of the predictor space greatly simplifies classification of a sample, and the classification can be well represented by a tree structure. Specifically, assuming that each predictor variable has one breakpoint, then the system has breakpoint vector $B = [b_1, b_2, \ldots b_m]$. For a sample $X_i = [x_{1,i} x_{2,i} \ldots x_{m,i}]^T$, the system compares its first response variable $x_{1,i}$ with the break point $b_1$ at the single root layer node, if it is less than $b_1$, the sample will be partitioned into the left child leaf; otherwise it will be classified to the right child leaf. Then the system compares $x_{2,i}$ with the breakpoint $b_2$ at the second layer nodes, and decide if the sample belongs to the left or right child leaf. The splitting procedure is repeated for all the response variables, until all m predictor variables have been processed. At the last level, there are $F = 2^m$ leafs, and each leaf is a class that is corresponding to one sub-space. FIG. 18 illustrates the classification process for FIG. 16, and FIG. 19 classification process for FIG. 17.

A m-bit binary code is assigned to every sub-space/class, assuming that each predictor variable has one breakpoint. By comparing every predictor variable of a m-dimensional sample compares with its respective breakpoint, 0 is assigned if smaller and 1 if bigger, this sample is converted into an m-bit code. This code is the index of the sub-space/class that this sample belongs to. FIG. 17(a) illustrates the binary codes of the 8 sub-spaces. It is to be understood that other indexes and things can be used.

Because of the tree structure, this partition and classification method is called classification tree. A similar tree structure can be applied to regression as well, so jointly this partition technique is generally referred to as classification and regression tree (CART).

The technique for up-scaling may be based on segmented linear regression and CART, and is comprised of a training phase and a testing phase:

(1) Training phase (offline training): using the LR images and the corresponding HR images as training pairs, the training phase learns the breakpoints for CART to classify a LR window into one of the many classes, and the linear filter coefficients of each class.

(2) Interpolation phase (real-time interpolation): using the breakpoints and linear filter coefficients from the training phase, the interpolation phase generates new HR pixels.

Figure 20:
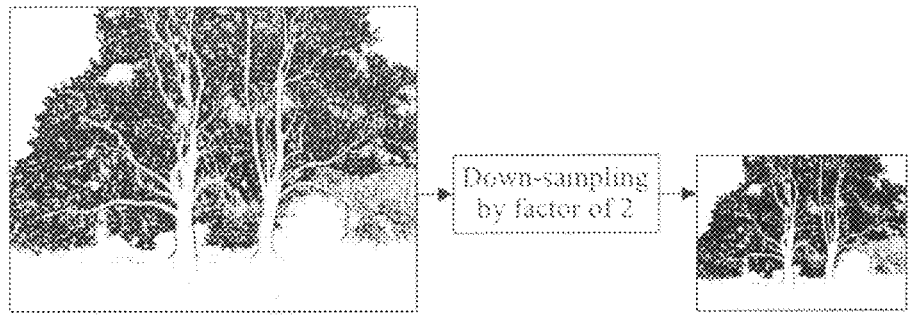
FIG. 20 illustrates HR and down sampled LR image.

Initially the training phase will be described. The training phase uses a number of LR-HR images pairs that have exactly (or substantially similar) the same contents but different resolutions as the training set. In order to make the LR-HR images have exactly (or substantially similar) same contents, the low resolution (LR) training images are obtained by down sampling the original high resolution (HR) images by factor of 2 (or other suitable factor), as illustrated by FIG. 20.

Figure 21:
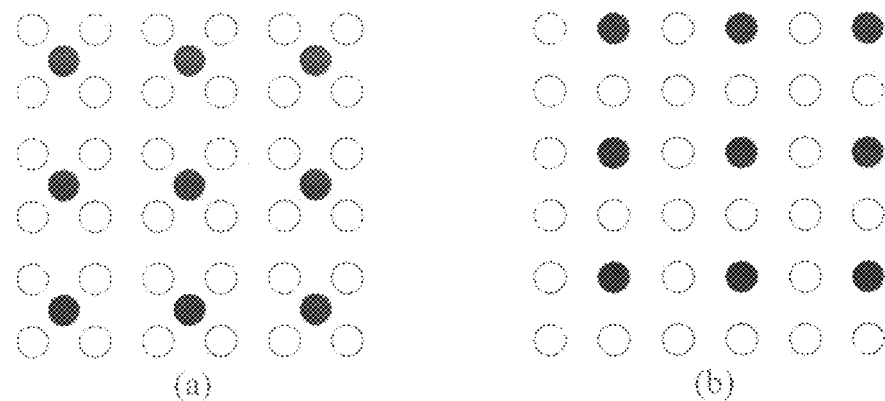
FIGS. 21 (a)-21(b) illustrates relative positions between LR and HR pixel grids.

The down-sampling technique can make the LR pixel grid be either co-siting with the HR pixel grid, or half-HR-pixel off from the HR pixel grid, which is illustrated in FIGS. 21(a) and (b), respectively. Other grid or spatial relationships may likewise be used, as desired.

To obtain co-sited LR images, the system may first filter the original HR images with a 7-tap low-pass FIR filter, and then do 2X decimation by dropping the pixels at odd columns and rows. To obtain half-pixel-off LR images, the system may directly apply either simplest 4-point averaging, bi-linear down-sampling with half pixel shifting or bi-cubic down-sampling with half pixel shifting to the HR images.

The choice of the grid setting preferably impacts the choice of the HR window. During the training and interpolation phases, the LR window is sequentially centered at every pixel of an input LR image. The size of the LR window determines the computation cost and the size of the training set. Bigger the LR window is, heavier the computation cost is and bigger the training set is. One preferred embodiment of the LR window size is 3 by 3.

Figure 22:
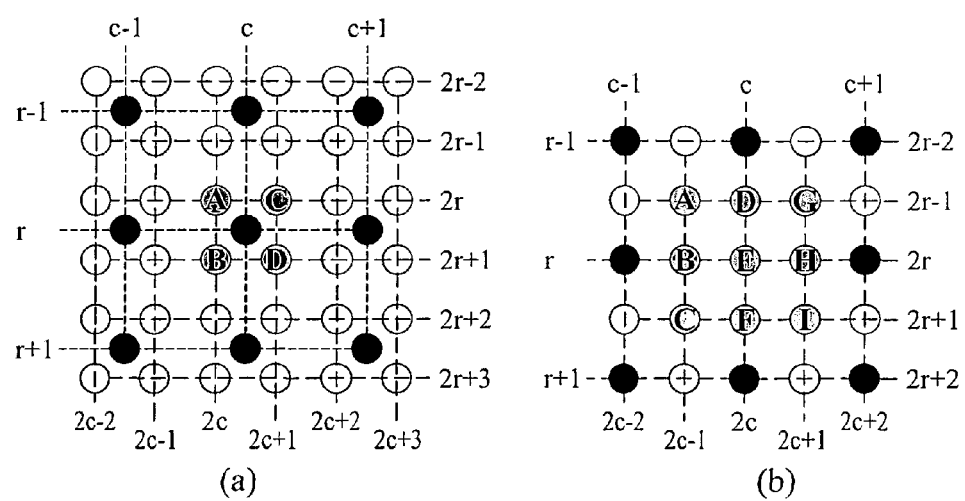
FIGS. 22(a)-22(b) illustrates LR and HR grids.

A HR window consists four or nine HR pixels interpolated from one LR window. The HR window of the half-pixel off grid setting consists of four HR pixels. As illustrated in FIG. 22(a), if the center of the LR window is at position of (c, r) in the LR image, the technique interpolates four pixels A, B, C, D, where A, B, C, and D are at position (2c, 2r), (2c+1, 2r), (2c, 2r+1), (2c+1, 2r+1), respectively.

The HR window of the co-sited grid setting consists of either four or nine HR pixels. As illustrated in FIG. 22(b), if the center of the LR window is at position of (c, r) in the LR image, there are the following five options:

(1) the technique interpolates four pixels A, B, D, E;

(2) the technique interpolates four pixels D, E, G, H;

(3) the technique interpolates four pixels B, C, E, F;

(4) the technique interpolates four pixels E, F, H, I;

(5) the technique interpolates nine pixels A, B, C, D, E, F, G, H, I.

where A is at (2c−1, 2r−1), B is at (2c−1, 2r), C is at (2c−1, 2r+1), D is at (2c, 2r−1), E is at (2c, 2r), F is at (2c, 2r+1), G is at (2c+1, 2r−1), H is at (2c+1, 2r), I is at (2c+1, 2r+1), respectively.

Options (1), (2), (3), and (4) have the four HR pixels un-symmetrically distributed in the LR window, and the HR windows are not overlapped. Option (5) has the nine HR pixels symmetrically distributed in the LR window, and is overlapped. HR pixels are generated multiple times from different LR windows in the interpolation phase. More specifically, pixels A, C, G, I are calculated four times, B, D, F, H two times, and E one time. The symmetry of HR pixels in a LR window assists in reducing the generation of undesirable artifacts.

The training images may be converted into monochrome images, such as by the following equation $$Y = 0.299R + 0.587G + 0.114B$$

The system may likewise be extended to include color images, where the training phases and/or interpolation account for the colors of the images.

In the training phase, the image up-scaling technique may find the breakpoints $B=[b_1\ b_2\ \ldots\ b_m]$ and the parameters of $f(X)$ from $X_i$ and $Y_i$, where $f(X)$ is defined by $$f(X) = \begin{cases} w_1 X & \text{if } X \in \Theta_1 \\ w_2 X & \text{if } X \in \Theta_2 \\ \vdots & \vdots \\ w_p X & \text{if } X \in \Theta_p \end{cases} \quad (3)$$

where $w_i$ is a n by m weight vector. Because the LR and HR window have the same mean, equation (3) does not define the offset term $v_i$ that is defined in equation (2).

The training samples $X_i$ and $Y_i$ are all the M LR windows and their corresponding M HR windows in the training image set. For example, a 3×3 window is used in the LR images, so m=9 in $X_i$; a 2×2 window is used in the HR images, so n=4 in $Y_i$. A number of 20 LR-HR image pairs may be used as training data where the LR resolution is 100×100 and the HR resolution is 200×200, so M=20*100*100.

The preferred optimization criterion is to minimize E defined in equation (1):

$$B, w_1, w_2 \ldots w_P = \underset{B,w_1,w_2 \ldots w_P}{\arg\min} \left( \sum_{i=1}^{M} (f(X_i) - Y_i)^2 \right) \quad (4)$$

This optimization cannot be solved by simple taking derivative with respective to B and $w_i$. A traditional approach is an exhaustive search: examines all possible breakpoints, calculate all the possible linear regression models and E, and picks the set that gives smallest E. Obviously, the exhaustive search is possible but quite time-consuming.

Figure 23:
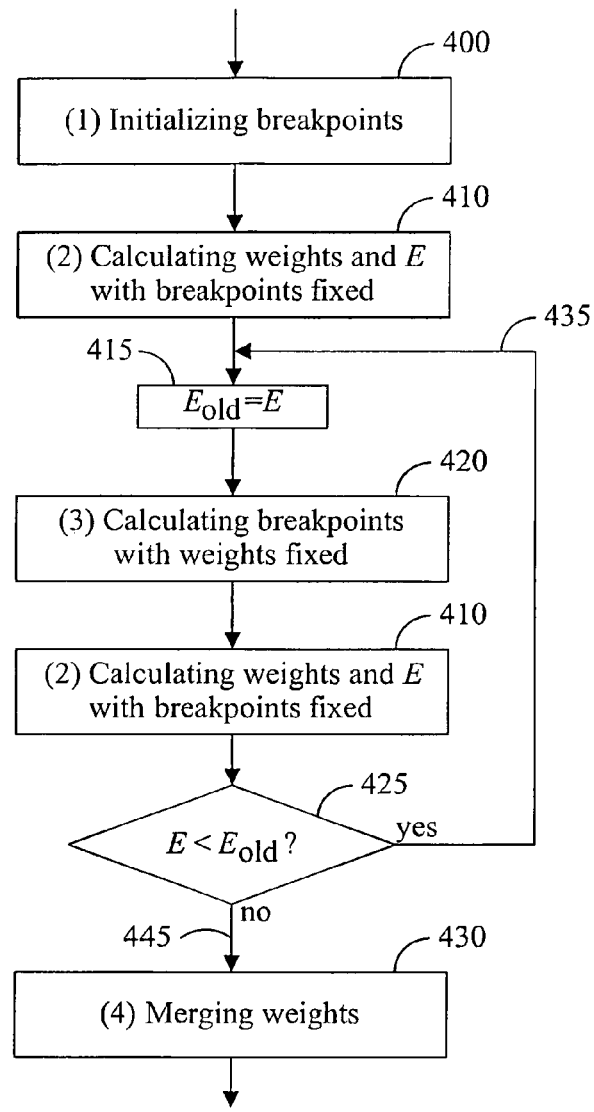
FIG. 23 illustrates the training phase.

An iterative approach may be used, as illustrated in FIG. 23, to perform the optimization. Specifically, the technique does not simultaneously optimize breakpoints and weights. Instead, the technique alternates between optimizing weights with breakpoints fixed and optimizing breakpoints with weights fixed to drive down E. The stopping condition of iteration is when E stops decreasing.

In summary, the training phase has four modules: (1) initializing breakpoints 400, (2) calculating the weights with the breakpoints fixed 410, (3) calculating the breakpoints with the weights fixed 420, and (4) merging weights 430.

Before iterations begin, the breakpoints $B=[b_1, b_2, \ldots b_m]^T$ are initialized 400. The initial breakpoints are the mean of all $MX'_i=[x'_{1,i} x'_{2,i} \ldots x'_{m,i}]^T$, $$b_j = \frac{1}{M} \sum_{i=1}^{M} x'_{j,i}$$

The normalization of $X_i$ is defined by $$x'_{j,i} = \frac{x_{j,i} - \min(X_i)}{\max(X_i) - \max(X_i)} \quad (5)$$

where $\min(X_i)$ is the minimal component in $X_i$, and max $(X_i)$ is the maximal component in $X_i$.

The normalization makes the new vector, $X'_i=[x'_{1,i} x'_{2,i} \ldots x'_{m,i}]^T$, which has the following characteristics:

$\max(X'_i)=1$ $\min(X'_i)=0$

Because all the components in $X'_i$ are between 0 and 1, $b_j$ is between 0 and 1.

Figure 24:
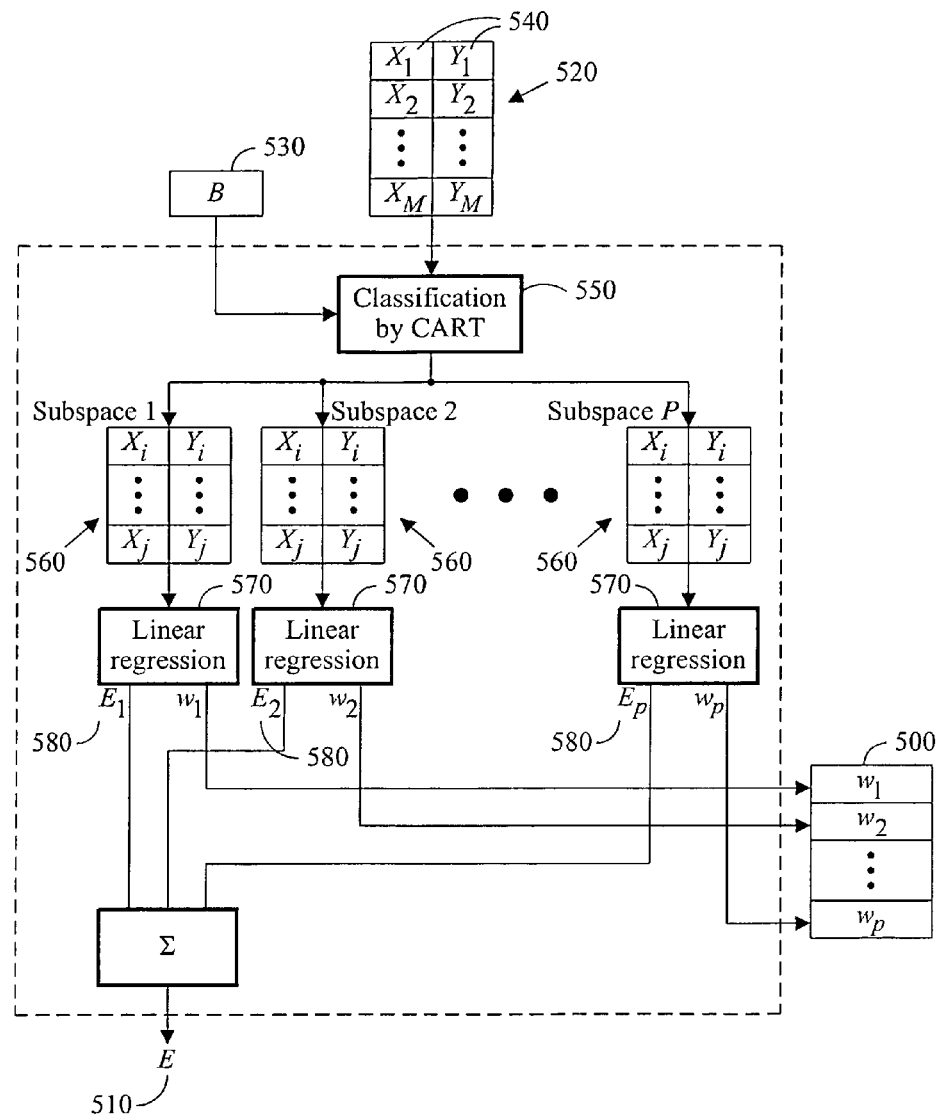
FIG. 24 illustrates updating the weights by breakpoints.

A breakpoint calculation module, illustrated by FIG. 24, calculates the weights $w_1 w_2 \ldots w_P$ 500 and E 510 while it keeps breakpoints B unchanged. The input of this module is the M training samples $X_i\text{-}Y_i$ 520 and breakpoints 530; the output is weights $w_1 w_2 \ldots w_P$ 500 and E 510.

First, every pair of $X_i\text{-}Y_i$ 540 is classified by CART 550 based on the breakpoints into one of the P sub-spaces 560. CART is not directly applied to the original sample $X_i$. Instead, it is applied to $X'_i$, normalized from $X_i$, which is discussed previously. The normalization takes out undesirable factors such as the offset term and amplitude.

Once all the M $X_i\text{-}Y_i$ has been classified into sub-spaces 560, the system uses linear regression 570 with a linear model to calculate $w_1 w_2 \ldots w_P$. The mathematical equations are $$w_1 = \arg\min_{w_1} \sum_{X_i \in \Theta_1} (w_1 X_i - Y_i)^2$$

$$w_2 = \arg\min_{w_2} \sum_{X_i \in \Theta_2} (w_2 X_i - Y_i)^2$$

$$\vdots$$

$$w_P = \arg\min_{w_P} \sum_{X_i \in \Theta_P} (w_P X_i - Y_i)^2$$

Weights $w_1 w_2 \ldots w_P$ minimize the prediction error 580 of respective class. The prediction error 580 of each class is $$E_1 = \sum_{X_i \in \Theta_1} (w_1 X_i - Y_i)^2$$

$$E_2 = \sum_{X_i \in \Theta_2} (w_2 X_i - Y_i)^2$$

$$\vdots$$

$$E_P = \sum_{X_i \in \Theta_P} (w_P X_i - Y_i)^2$$

Then the total E 510 is $$E = E_1 + E_2 + \ldots E_P$$

Figure 25:
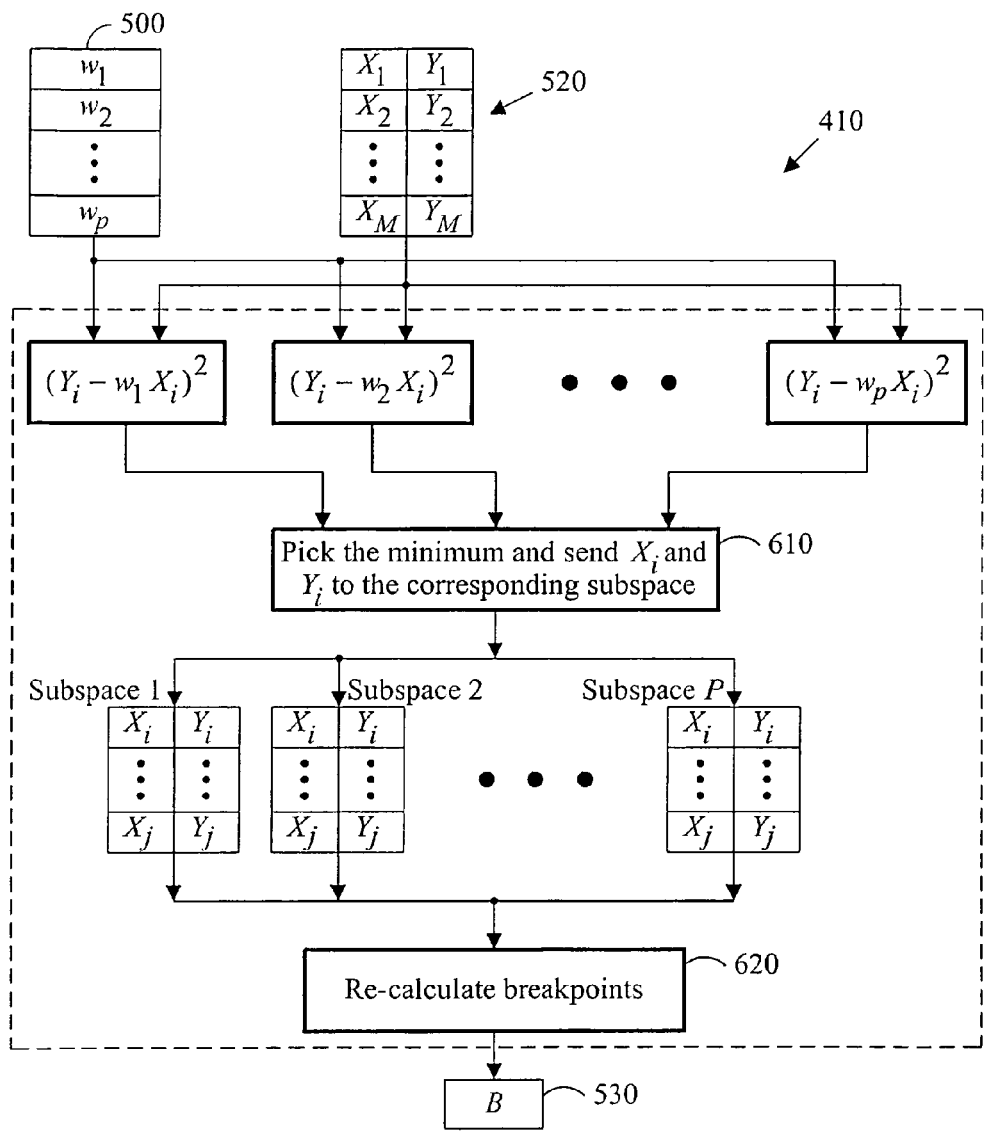
FIG. 25 illustrates updating the breakpoints by weights.

Referring again to FIG. 23, the process initializes the breakpoints 400 then calculates the weights and E 410 based upon the initialized breakpoints, as illustrated in FIG. 24. Then system then calculates breakpoints with the weights fixed 420, as illustrated in FIG. 25. FIG. 25, calculates the breakpoints B 530 while keeping the weights $w_1 w_2 \ldots w_P$ 500 unchanged. The input of this module is the M 520 training samples $X_i\text{-}Y_i$ 520 and $w_1 w_2 \ldots w_P$ 500 while the output is B 530.

This module also classifies training samples first. However, the classification is not based on CART and breakpoints. Instead, it uses the weights $w_i w_2 \ldots w_P$ 500 to do the classification. More specifically, the sub-space/class that $X_i$-$Y_i$ pair 560 belongs to is the weight set that gives the minimal predictor error among all P sets of weights 610:

$$\text{index}(X_i) = \arg\min_j (w_j X_i - Y_i)^2, \; j \in \{1, 2, \ldots P\}$$

In other words, the module 410 tries all the P sets of weights on $X_i$ to predict $Y_i$, to find the set of weights that give the minimal prediction error, and put $X_i$-$Y_i$ into the corresponding sub-space/class.

After all the M samples are classified into subspaces by the above technique, the module 410 derives the new break points 620. In the case of binary CART, half of the $2^m$ sub-spaces whose $x_i$ are bigger than $b_i$, and the i-th bit in the indexes of these sub-spaces is 1; half of the sub-paces whose $x_i$ are smaller than $b_i$, and the i-th bit in their indexes is 0. For example, if the predictor space is 3 dimensional (FIG. 16), then there are 8 sub-spaces. The sub-spaces with indexes 010, 011, 110, and 111 have their $x_2$ bigger than $b_2$, and the sub-spaces with indexes 000, 001, 100, and 101 have their $x_2$ smaller than $b_2$.

To determine $b_i$, the system first collects samples that belong to the $2^{m-1}$ sub-paces whose $x_i$ are bigger than $b_i$ into $A_i$, and samples that belong to the $2^{m-1}$ sub-paces whose $x_i$ are smaller than $b_i$ into $B_i$. Then the system does:

$$b_1 = (\text{mean}(A_1) + \text{mean}(B_1))/2$$

$$b_2 = (\text{mean}(A_2) + \text{mean}(B_2))/2$$

$$\vdots$$

$$b_m = (\text{mean}(A_m) + \text{mean}(B_m))/2$$

Figure 26:
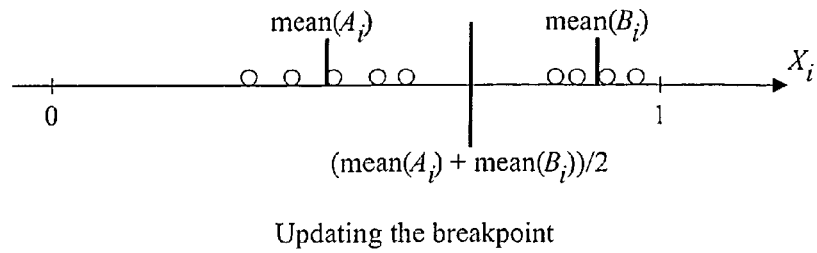
FIG. 26 illustrates updating the breakpoint.

The above procedure is illustrated graphically in FIG. 26.

Referring again to FIG. 23, the technique include calculating breakpoints 420 and calculating weights and E 410. Before calculating new breakpoints 420 and weights and E 410, the current value of E is maintained as $E_{old}$ 415. After calculating new breakpoints 420 and weights and E 410, the modified value of E is compared against the maintained value of $E_{old}$ at block 425 to determine if the error has decreased. If the error has decreased, then the process is repeated 435. If the error has not decreased, then the iteration process is ended 445 and the weights are merged at block 430.

A weight reduction module 430 may be used. The input is the trained weights $w_1 w_2 \ldots w_P$, where $w_j$ is n by m. The output is a vector table with the size of L by m, where L is much smaller than Pn, and an index lookup table that will be used by the interpolation phase to map the vector table back to $w_1 w_2 \ldots w_P$.

The reduction is based on the fact that there is strong redundancy among weights across different sub-spaces. More specifically, many sub-spaces can merge their weights into one set without sacrificing the performance.

The reduction is done by using the k-means clustering technique clustering on $w_1, w_2, \ldots w_P$, where $P = 2^m$. Weight vector $w_j$ of class i can be viewed as a n by m matrix, where m is the pixel number in the LR window and n is the pixel number in the HR window. Assuming that n=4 (2×2 HR window), and m=9 (3×3 LR window), all the 512 weight vectors are $$w_1 w_2 \ldots w_{512} = \begin{bmatrix} w_{11} \\ w_{12} \\ w_{13} \\ w_{14} \end{bmatrix} \begin{bmatrix} w_{21} \\ w_{22} \\ w_{23} \\ w_{24} \end{bmatrix} \ldots \begin{bmatrix} w_{5121} \\ w_{5122} \\ w_{5123} \\ w_{5124} \end{bmatrix}$$

Each of the components, $w_{st}$, ($1 \leq s \leq 512$, $1 \leq t \leq 4$) in the above matrices is a 1 by 9 vector, and is responsible for generating HD pixel with index t for class s. The system re-organizes these weight vectors into 4 groups:

$$\begin{bmatrix} w_{11} \\ w_{21} \\ \vdots \\ w_{5121} \end{bmatrix} \begin{bmatrix} w_{12} \\ w_{22} \\ \vdots \\ w_{5122} \end{bmatrix} \begin{bmatrix} w_{13} \\ w_{23} \\ \vdots \\ w_{5123} \end{bmatrix} \begin{bmatrix} w_{14} \\ w_{24} \\ \vdots \\ w_{5124} \end{bmatrix}$$

A column is the weight vectors across all the classes to generate one of the four HD pixels. The system applies k-means clustering to each group independently.

The k-mean clustering will cluster the number of weight vectors into certain number of centroids. In the above case, the clustering target could be 128 centroids. The centroids and the table that maps from the weight vectors to the group are the results. In the prediction phase, these centroids and the table are used to recover the full-size weight vectors.

Figure 27:
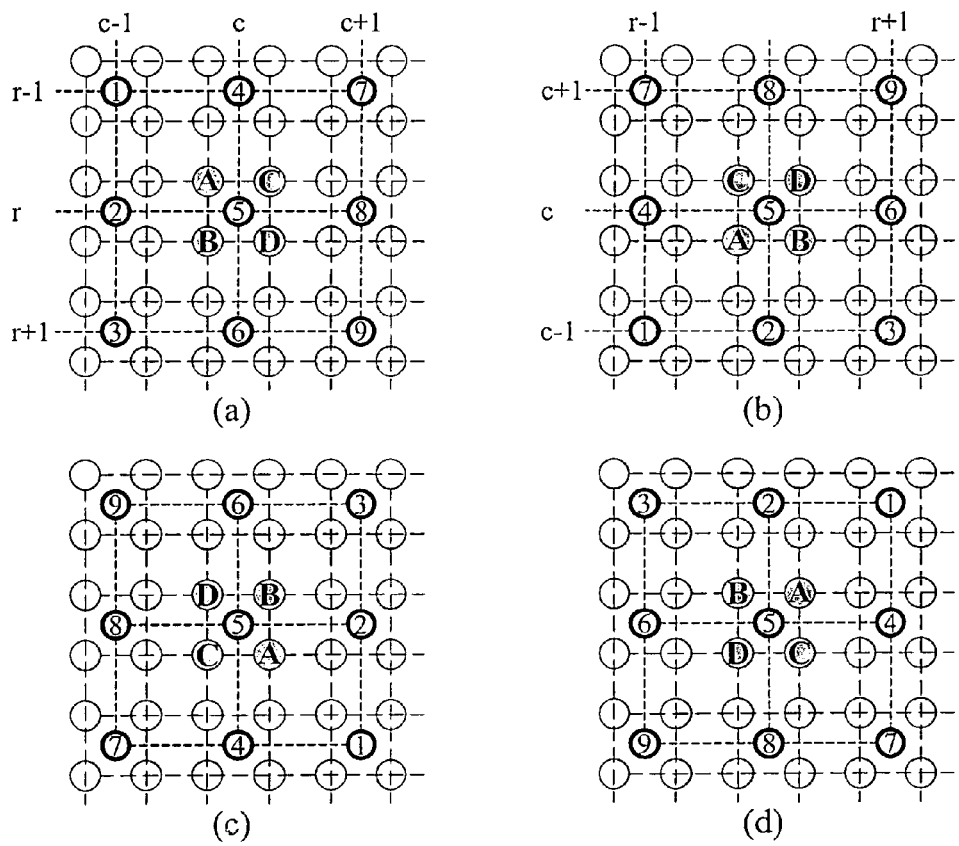
FIGS. 27(a)-27(d) illustrates LR windows and its generated HR pixels.

When the HD pixels interpolated from a LR window are symmetrically distributed in the LR window, the system can further reduce the size by exploiting the redundancy among the symmetric positions. For example, FIG. 27 shows the case that the LR window is 3×3, and the HR window is 2×2. The HD pixels generated from the LR window are symmetric around the center pixel. When the system rotates the LR-HR window anti-clockwisely by 90, 180 and 270 degrees, pixels C, D, and B are at the position of pixel A, respectively, as illustrated by FIG. 27(*b-d*). The rotation of the LR-HR window is equal to re-ordering the components in the weight vectors. Specifically, if the system represents a weight vector $w_{ij} = [v_1 \; v_2 \; v_3 \; v_4 \; v_5 \; v_6 \; v_7 \; v_8 \; v_9]$ For pixel B, the system rotates 90 degree, and the re-ordered weight vector is: $w_{i2}^{90} = [v_7 \; v_4 \; v_1 \; v_8 \; v_5 \; v_2 \; v_9 \; v_6 \; v_3]$ For pixel C, the system rotates 180 degree, and the re-ordered weight vector is: $w_{3i}^{180} = [v_9 \; v_8 \; v_7 \; v_6 \; v_5 \; v_4 \; v_3 \; v_2 \; v_1]$ For pixel D, the system rotates 270 degree, and the re-ordered weight vector is: $w_{i4}^{270} = [v_3 \; v_6 \; v_9 \; v_2 \; v_5 \; v_8 \; v_1 \; v_4 \; v_7]$ Then after re-ordering, the system concatenates these weight vectors into one group, and apply k-means clustering to this group. In the interpolation phase, the technique may revise this re-ordering.

Figure 28:
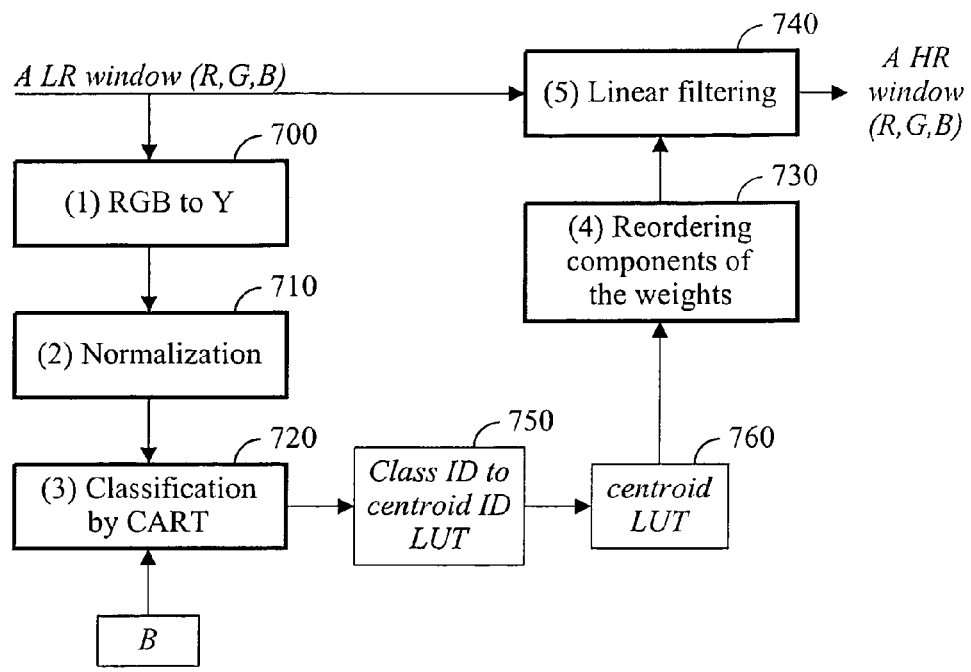
FIG. 28 illustrates generating a HR window from a LR window in the interpolate phase.

FIG. 28 shows a block-diagram of generating a HR window from a LR window in the interpolation phase, which includes the following five modules:

(1) RGB to L 700

If the input LR image is a color image with red, green and blue sub-pixels, the technique convert to luminance by the following equation $Y = 0.299R + 0.587G + 0.114B$ (2) Normalization 710

The normalization module normalizes the luminance of the pixels in the input LR window into range [0 1] that is defined by equation (5).

(3) Classification by CART 720

Classification by CART uses the breakpoints B obtained in the training phase. The class ID from the classification refers to the "class ID to centroid ID" LUT 750 to get the proper centroid ID, and the centroid ID leads to the centroids stored in the LUT 760.

(4) Reordering components of the weights 730

Some weights are re-ordered before k-means clustering in the training phase. The centroids are needed to be revisely re-ordered to get the proper weight vectors $w_j$.

(5) Linear filtering 740

The technique applies $w_j$ to the RGB channels separately to generate the interpolated RGB HR pixels.

If the HR window contains 9 pixels, then some HR pixels are generated multiple times by different windows. The technique uses averaging to get the final results.

Referring again to FIG. 1, as previously explained, the value of α is used in the interpolation technique to compute the final value of interpolated pixels.

The fallback interpolation 70 may use any suitable technique, such as single bi-linear, or single bi-cubic, and the filter based technique described in FIGS. 14-28. Referring to FIG. 13, an interpolation technique for ul 71, ur 72, and dl 73 is illustrated.

The technique also defines a set of coefficients for a fallback non-directional interpolation. When the edge orientation is estimated, a scalar, α, between 0 and 1 is also computed to indicate the reliability of the estimation. Eventually, the results from the directional interpolation and the non-directional interpolation is blended together based on α. The fallback interpolation and the directional interpolated results are blended together by a scalar α 30. Let $p^d$ denote the result of the directional interpolation, and let $p^n$ denote the result of the non-directional fallback interpolation for pixel p. This applies to any of the new pixels that are interpolated, i.e. pixels ul 71, ur 72 and dl 73. Then, the final interpolated pixel value $p^f$ is defined by $p^f = \alpha \sim p^d + (1-\alpha) \sim p^n$.

The technique restricts all the computation within the 5×5 window, and does not use iteration.

A non-iteration based technique reduces buffering and reduces the necessary calculation speed for a hardware based implementation. The technique generates the upscaled output image in a single pass over the input image. After the interpolated pixels are calculated from the input pixels, no further operations are performed in the output image.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for interpolation comprising:
   (a) receiving an input image having a plurality of pixels;
   (b) estimating an edge direction proximate a first pixel of said input image from a first technique that uses a finite plurality of stored, predetermined potential directions which includes at least one predetermined direction that is not vertical and is not horizontal;
   (c) selecting an edge direction based upon said estimating said edge direction proximate said first pixel of said input image using a second technique;
   (d) interpolating respective first values of new pixels proximate said first pixel based upon said selected edge direction;
   (e) interpolating respective second values of said new pixels based upon another technique that is not based upon an estimated or selected edge direction;
   (f) determining interpolated values of said new pixels for an output image having more pixels than said input image based upon at least one of said respective first values and said respective second values;
   (g) wherein said another technique includes a set of filters based upon a low-resolution data set and a high-resolution data set suitable for interpolating said input image, wherein said filters are collectively representative of at least a portion of an image space and a substantial number of said filters are representative of a respectively selected one of a volume and/or a shape within said image space.

2. The method of claim 1 wherein said estimating is based upon a gradient.

3. The method of claim 1 wherein said estimating is based upon a 5 by 5 window of pixels.

4. The method of claim 1 wherein said estimating is performed upon a majority of said plurality of pixels of said image.

5. The method of claim 1 wherein said estimating is based upon the luminance of said image.

6. The method of claim 1 further comprising determining a reliability measure that said edge direction is suitable and where said determining interpolated values of said new pixels for an output image having more pixels than said input image is based upon a linear combination of the respective interpolations produced from step (d) and step(e), each weighted using said reliability measure.

7. The method of claim 6 wherein said reliability measure is a weighted reliability measure.

8. The method of claim 1 wherein said selecting is based upon 3 directions.

9. The method of claim 1 wherein said selecting is based upon the next closest direction to the direction of said estimating.

10. The method of claim 1 wherein said step of determining interpolated values of said new pixels for an output image includes no iterations.

11. The method of claim 1 wherein said plurality of predetermined directions is comprised of: −45 degrees, −26.6 degrees, −18.4 degrees, 18.4 degrees, 26.6 degrees, 45 degrees, 63.4 degrees, 71.6 degrees, 108.4 degrees and 116.6 degrees, all modulo 180 degrees.

12. The method of claim 1 wherein said estimating is based on a plurality of pixels proximate said first pixel.

13. The method of claim 1 wherein said selecting is based upon the pixels in a 5 by 5 window centered around said first pixel.

14. The method of claim 1 wherein the step of determining interpolated values of said new pixels for an output image is based upon the pixels in a 5 by 5 window centered around said first pixel.

15. The method of claim 1 wherein said estimating, said selecting, and said determining are each based upon the pixels in a 5 by 5 window centered around said first pixel.

16. The method of claim 1 wherein the interpolated respective first values of new pixels proximate said first pixel based upon said selected edge direction are weighted using a reliability measure.

17. The method of claim 1 wherein the interpolated respective second values of said new pixels proximate said first pixel based upon said another technique are weighted using a reliability measure.

18. The method of claim 1, wherein said step of interpolating respective first values of new pixels proximate said first pixel based upon said selected edge direction is based on pixels in the input image that are near the pixel to be interpolated and near a line through that pixel with an orientation equal to said selected edge direction.

19. The method of claim 18 wherein said interpolating respective first values of new pixels based upon said selected edge direction is based on either 2 pixels in the input image or 4 pixels in the input image.

20. The method of claim 1 wherein said plurality of potential directions is a plurality of discrete directions.

21. The method of claim 1 wherein said filters are generated based upon a classification process.

22. The method of claim 21 wherein said classification process includes regression.

23. The method of claim 1 wherein said filters are based upon minimization of an error of an entire set of said filters for a data set.

24. The method of claim 21 wherein said classification process includes multi-way splits of a predictor variable.

25. The method of claim 1 wherein said filters are based upon using a dimension-wise statistical technique.

26. The method of claim 21 wherein said classification requires no more than N comparisons, where N is the number of pixels in a window used for said generating said high resolution image.

* * * * *

UNITED STATES PATENT AND TRADEMARK OFFICE
CERTIFICATE OF CORRECTION

PATENT NO. : 8,538,203 B2
APPLICATION NO. : 11/998496
DATED : September 17, 2013
INVENTOR(S) : Hao Pan It is certified that error appears in the above-identified patent and that said Letters Patent is hereby corrected as shown below:

Title Page - Item (57) Abstract, Line 5

Change "is selected based upon the estimating the edge" to read --is selected based upon estimating the edge--.

In the Specification:

Col. 6, Line 17

Change "$abs(p_6 - p_4) + abs(p_{15} - p_{13}) + abs(p_{16} - 14)\}$" to read --$abs(p_6 - p_4) + abs(p_{15} - p_{13}) + abs(p_{16} - p_{14})\}$--.

Col. 12, Line 46

Change "$MX_i^l = [x_{1,i}^l, x_{2,i}^l \ldots x_{m,i}^l]^T$," to read --$MX_i^l = [x_{1,i}^l, x_{2,i}^l \ldots x_{m,i}^l]^T$--.

Col. 16, Line 28

Change "$p^f = a \sim p^d + (1 - \alpha) \sim p^n$," to read --$p^f = \alpha \cdot p^d + (1 - \alpha) \cdot p^n$--.

Signed and Sealed this
Twenty-ninth Day of April, 2014

Michelle K. Lee
*Deputy Director of the United States Patent and Trademark Office*